(12) United States Patent
Tal et al.

(10) Patent No.: US 10,387,044 B2
(45) Date of Patent: Aug. 20, 2019

(54) DEDUPLICATION IN A DISTRIBUTED STORAGE SYSTEM

(71) Applicant: Kaminario Technologies Ltd., Yokne'am Ilit (IL)

(72) Inventors: Doron Tal, Haifa (IL); Eyal Gordon, Haifa (IL)

(73) Assignee: Kaminario Technologies Ltd., Yokne'am ILIT (IL)

( * ) Notice: Subject to any disclaimer, the term of this patent is extended or adjusted under 35 U.S.C. 154(b) by 0 days.

(21) Appl. No.: 15/479,393

(22) Filed: Apr. 5, 2017

(65) Prior Publication Data

US 2018/0292995 A1 Oct. 11, 2018

(51) Int. Cl.
*G06F 3/06* (2006.01)

(52) U.S. Cl.
CPC ............ *G06F 3/0608* (2013.01); *G06F 3/067* (2013.01); *G06F 3/0641* (2013.01)

(58) Field of Classification Search
None
See application file for complete search history.

(56) References Cited

U.S. PATENT DOCUMENTS

| 87,511,763 | 6/2014 | Ramarao |
| 9,262,430 B2 | 2/2016 | Tal et al. |
| 2011/0066628 A1 | 3/2011 | Jayaraman |
| 2014/0143213 A1* | 5/2014 | Tal .................... G06F 17/30156 707/692 |
| 2015/0205727 A1* | 7/2015 | Kimmel ................ G06F 3/0611 711/103 |
| 2016/0110388 A1 | 4/2016 | Tal et al. |

* cited by examiner

*Primary Examiner* — Denise Tran
(74) *Attorney, Agent, or Firm* — Wiggin and Dana LLP; Gregory S. Rosenblatt

(57) ABSTRACT

The presently disclosed subject matter includes various inventive aspects, which are directed for enabling execution of deduplication during data writes in a distributed storage-system.

33 Claims, 15 Drawing Sheets

DEDUPLICATION IN A DISTRIBUTED STORAGE SYSTEM

FIELD OF THE PRESENTLY DISCLOSED SUBJECT MATTER

The presently disclosed subject matter is related to the field of computer storage systems and to the implementation of deduplication in a computer storage system.

BACKGROUND

Data deduplication is used in data storage systems for eliminating duplicate copies of the same data in order to reduce the storage space overhead.

GENERAL DESCRIPTION

The presently disclosed subject matter includes methods and systems enabling execution of deduplication during data writes in a distributed computer storage-system.

According to one aspect of the presently disclosed subject matter there is provided a method executable in a storage-system comprising a plurality of computer devices, each computer device is assigned with access to a respective storage area in the storage-system and is responsive for handling write requests addressed to the respective storage area, the method comprising:

at a first computer device from the plurality of computer devices:

receiving a first write request including a first write data addressing a first logical block address; computing a first hash value for the first write data;

dividing the first hash value into a first hash value part (H1) and a second hash value part (H2); assigning a first deduplication ID for the first write data, wherein deduplication IDs are assigned such that they are unique within the address space of the first logical block address; providing a first virtual address reference key for the first write data, comprising the first logical block address and the first deduplication ID; querying a deduplication database (DDB) to determine whether H1 and H2 are already associated with an existing deduplication database entry (DDE) referencing an existing virtual address entry associated with a second logical block address assigned to a second computer device from the plurality of computer devices and; and if yes:

creating a first virtual address entry, comprising: the first virtual address reference key and a first pointer pointing to the existing virtual address entry, the existing virtual address entry comprises a second pointer, pointing to a storage location, assigned to the second computer device, where the write data is stored; and storing the first virtual address entry in a storage location assigned to the first computer device.

In addition to the above features, the system according to this aspect of the presently disclosed subject matter can optionally comprise one or more of features (i) to (xix) below, in any technically possible combination or permutation.

i. wherein the first virtual address entry further comprises a validity indicator indicating that a read request addressing the first logical block address is to be directed to read data associated with the first virtual address entry.

ii. The method further comprising, incrementing a reference counter of the existing DDE by 1.

iii. Wherein the first logical block address refers to a logical block address range comprising one or more blocks.

iv. wherein if H1 or H2 are not already associated with an existing DDE:

creating a new DDE to be stored at the DDB for the first write data, the new DDE comprising: H1 referencing respective data comprising:

H2, the first logical block address; the first deduplication ID; and a reference counter which is set to indicate that there is one virtual address entry associated with the new DDE; and creating a first virtual address entry comprising the first virtual address reference key and a first pointer pointing to a storage location, assigned to the first computer device, where the write data is stored; and storing the first virtual address entry in the storage area assigned to the first computer device.

v. wherein the providing of the first virtual address entry further comprises, providing a validity indicator set to indicate that a read request addressing the first logical block address should be directed to read data associated with the first virtual address entry.

vi. The method further comprising, setting a reference counter of the new DDE to indicate that one virtual address entry is referenced by the new DE.

vii. The method wherein at the time of receiving the first write request, a first existing virtual address entry is already associated with the first logical block address assigned to the first computer device; the first existing virtual address entry comprises a pointer pointing to another existing virtual address entry associated with a logical block address assigned to a different computer device; the method further comprising:

deleting the pointer pointing to the existing virtual address entry; and sending a decrement request to the DDB requesting to decrement the reference counter of a DDE referencing the other virtual address entry.

viii. The method further comprising, at the DDB:

responsive to the decrement request, decrementing the reference counter of the DDE referencing the other virtual address entry, by 1; deleting the DDE referencing the other virtual address entry, if the reference counter of the DDE referencing the other virtual address entry indicates that no virtual address entry is referenced by it; and sending a notification to the different computer device that the DDE has been deleted.

ix. The method further comprising, at the different computer device, deleting the other virtual address entry.

x. wherein at the time of receiving the first write request, a first existing virtual address entry is already associated with the first logical block address assigned to the first computer device and a second existing virtual address entry associated with another logical block address comprises a pointer pointing to the first existing virtual address entry and a validity indicator of the first existing virtual address entry indicates that a read request addressing the first logical block address should be directed to read data associated with the first existing virtual address entry; the method further comprising:

updating a validity indicator of the first existing virtual address entry to indicate that a read request addressing the first logical block address should not be directed to read data associated with the first existing virtual address entry; and sending a decrement request to the DDB requesting to decrement a reference counter of a DDE referencing the first existing virtual address entry.

xi. Wherein the another block address associated with the second existing virtual address entry is assigned to another computer device.

xii. The method further comprising: at the DDB, responsive to the decrement request, decrementing the reference counter of the DDE referencing the first existing virtual address entry.

xiii. The method further comprising, at the first computer device:
- setting a 'deduplication database reference' counter stored at the first virtual address entry to equal 1; the deduplication database reference counter is indicative of a last available value of the reference counter of the new DE;
- setting a 'num decrements' counter stored at the first virtual address entry to equal zero; the num decrements counter is indicative of a number of decrement notification messages received at the first computer device indicating that a pointer referencing the first virtual address entry has been deleted.

xiv. The method further comprising, wherein at the time of receiving the first write request, a first existing virtual address entry is already associated with the first logical block address assigned to the first computer device; the first existing virtual address entry comprises a pointer pointing to another virtual address entry associated with a logical block address assigned to a different computer device; the method further comprising:
- deleting the pointer pointing to the other virtual address entry; and notifying the different computer device indicating that the pointer has been deleted.

xv. The method further comprising, at the different sever:
- incrementing a num_decrements counter of the other virtual address entry by 1;
- if the num_decrements counter of the other virtual address entry is equal or greater than a deduplication database reference counter of the other virtual address entry and a validity indicator of the other virtual address entry is false, sending a decrement request to the DDB requesting to decrement the reference counter of the DDE referencing the other virtual address entry by a value which equals the num decrements counter; receiving an updated reference counter value, after completion of the decrement request at the DDB;
- if the updated reference counter value equals zero, deleting the other virtual address entry; if the updated reference counter value is greater than zero:
- updating the deduplication database reference counter to equal the received reference counter value; and setting the respective num decrements value to equal 0.

xvi. The method further comprising, at the DDB, deleting the DDE referencing the other virtual address entry, if the reference counter of the DDE referencing the other virtual address entry indicates that no virtual address entry is referenced by it.

xvii. wherein at the time of receiving the first write request, a first existing virtual address entry is already associated with the first logical block address assigned to the first computer device and a second existing virtual address entry stored at another computer device comprises a pointer pointing to the first existing virtual address entry and a validity indicator of the first existing virtual address entry indicates that a read request addressing the first logical block address should be directed to read data associated with the first existing virtual address entry; the method further comprising:
- updating a validity indicator of the first existing virtual address entry to indicate that a read request addressing the first logical block address should not be directed to read data associated with the first existing virtual address entry; incrementing a num_decrements counter of the first existing virtual address entry by 1;
- if a num_decrements counter of the first existing virtual address entry is equal or greater than a DDB reference counter of the first existing virtual address entry, sending a decrement request to the DDB requesting to decrement the reference counter at the DDE referencing the second existing virtual address entry by a value which equals the num_decrements counter;
- receiving an updated reference counter value, after completion of the decrement request at the DDB; and
- if the updated reference counter value equals zero, deleting the first existing virtual address entry; if the updated reference counter value is greater than zero: updating the respective DDB reference counter to equal the received reference counter value; and setting the respective num decrements value to equal 0.

xviii. The method further comprising, at the DDB:
- responsive to the decrement request, decrementing the reference counter at the DDE referencing the first existing virtual address entry by the DDB decrement value; and deleting the DDE referencing the first existing virtual address entry if the reference counter indicates that number of virtual addresses entries that are associated with the DDE is zero.

xix. Wherein the first hash value calculated based on the first write data is a strong hash value.

According to another aspect of the presently disclosed subject matter there is provided a distributed data-storage system comprising a plurality of computer devices operatively connected to one or more storage devices constituting a physical storage space of the data-storage system; wherein each computer device of the plurality of computer devices is assigned with access to a respective logical block address area having a corresponding physical storage area in the physical storage space, and is responsive for handling I/O requests addressed to the respective logical block address area; a first computer device from among the plurality of computer devices is configured to:

receive a first write request including a first write data addressing a first logical block address; compute a first hash value based on the first write data; divide the first hash value into a first hash value part (H1), and a second hash value part (H2); assign a first deduplication ID for the first write data, wherein deduplication IDs are assigned such that they are unique within the address space of the first logical block address; provide a first virtual address reference key for the first write data, comprising the first logical block address and the first deduplication ID;

query a deduplication database (DDB) to determine whether H1 and H2 are already associated with an existing deduplication database entry (DDE) referencing a first existing virtual address entry associated with a second logical block address assigned to a second computer devices from the plurality of computer devices, and if yes:

create a first virtual address entry, comprising: the first virtual address reference key and a first pointer pointing to the first existing virtual address entry, the first existing virtual address entry comprises a second pointer, pointing to a storage location, assigned to the second computer device, where the write data is stored; and store the first virtual address entry in a storage location assigned to the first computer device.

According to another aspect of the presently disclosed subject matter there is provided a program storage device readable by a computer, tangibly embodying a program of instructions executable by the computer to perform a method of deduplication management in a storage system, the method comprising:

receiving a first write request including a first write data addressing a first logical block address;

computing a first hash value based on the first write data;

dividing the first hash value into a first hash value part (H1), and a second hash value part (H2);

assigning a first deduplication ID for the first write data, wherein deduplication IDs are assigned such that they are unique within the address space of the respective logical block address;

providing a first virtual address reference key for the first write data, comprising the first logical block address and the first deduplication ID;

querying a deduplication database (DDB) to determine whether H1 and H2 are already associated with an existing deduplication database entry (DDE) referencing an existing virtual address entry associated with a second logical block address assigned to a second computer device from the plurality of computer devices, and if yes:

creating a first virtual address entry, comprising:

the first virtual address reference key and a first pointer pointing to the existing virtual address entry, the existing virtual address entry comprises a second pointer, pointing to a storage location, assigned to the second computer device, where the write data is stored; and storing the first virtual address entry in a storage location assigned to the first computer device.

According to another aspect of the presently disclosed subject matter there is provided a computer device configured to operate in a distributed data-storage system; the data-storage system comprises a plurality of computer devices operatively connected to one or more storage devices constituting a physical storage space of the data-storage system; wherein each computer device of the plurality of computer devices is assigned with access to a respective logical block address area having a corresponding physical storage area in the physical storage space, and is responsive for handling I/O requests addressed to the respective logical block address area; the first computer device is configured to:

receive a first write request including a first write data addressing a first logical block address; compute a first hash value based on the first write data; divide the first hash value into a first hash value part (H1), and a second hash value part (H2); assign a first deduplication ID for the first write data, wherein deduplication IDs are assigned such that they are unique within the address space of the respective logical block address; provide a first virtual address reference key for the first write data, comprising the first logical block address and the first deduplication ID;

query a deduplication database (DDB) to determine whether H1 and H2 are already associated with an existing deduplication database entry (DDE) referencing a first existing virtual address entry associated with a second logical block address assigned to a second computer device from the plurality of computer devices. and if yes:

create a first virtual address entry, comprising: the first virtual address reference key and a first pointer pointing to the first existing virtual address entry, the first existing virtual address entry comprises a second pointer, pointing to a storage location, assigned to the second computer device, where the write data is stored; and store the first virtual address entry in a storage location assigned to the first computer device.

The data-storage system, the non-transitory program storage device, and the computer device disclosed herein according to various aspects, can optionally further comprise one or more of features (i) to (xix) listed above, mutatis mutandis, in any technically possible combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
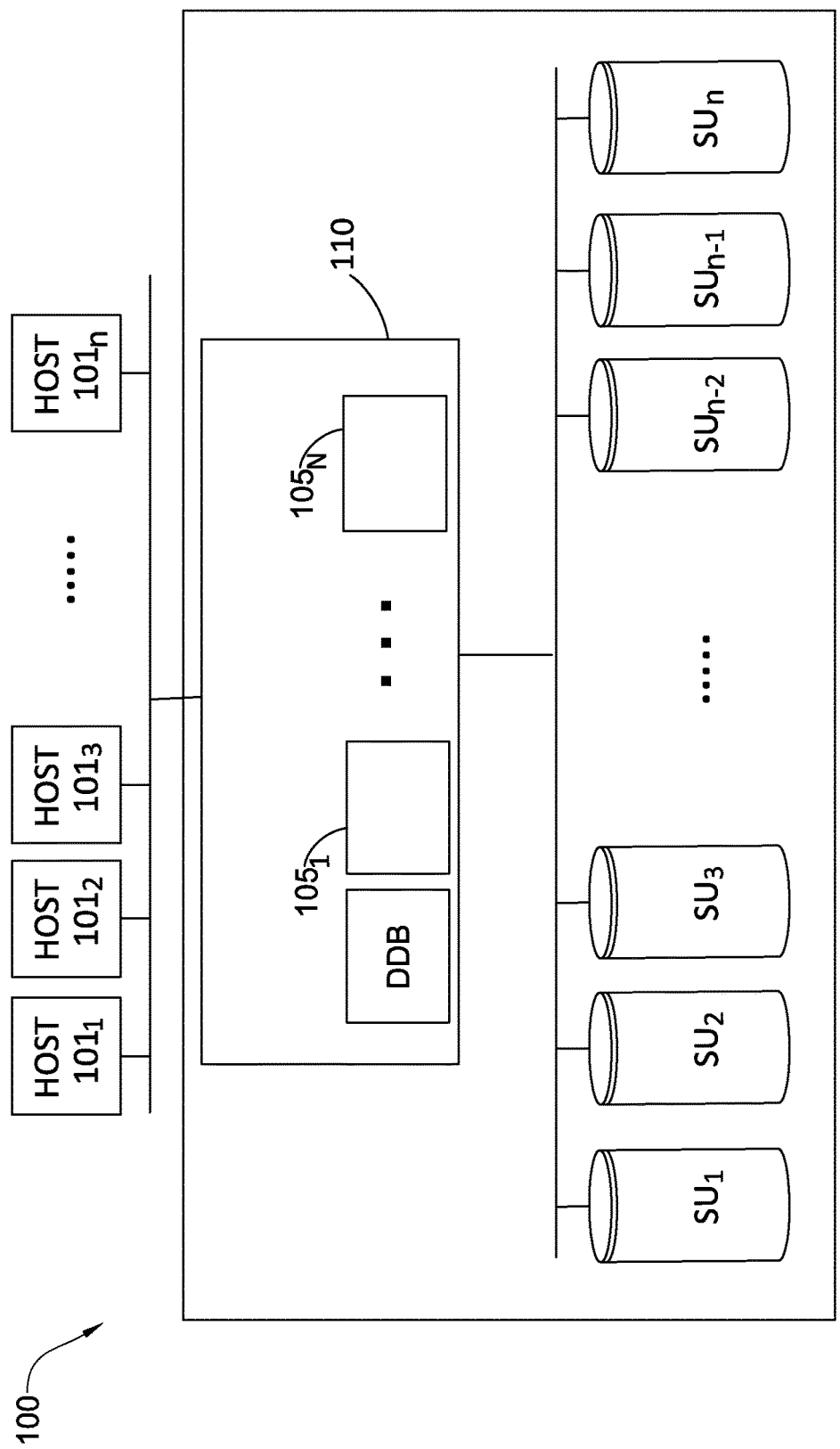
FIG. 1 is a schematic block-diagram illustration of a computer storage system according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Unless specifically stated otherwise, as apparent from the following discussions, it is appreciated that throughout the specification discussions utilizing terms such as "receiving", "computing", "dividing", "assigning", "providing", "querying", "storing" or the like, include actions and/or processes of a computer that manipulate and/or transform data into other data, said data represented as physical quantities, e.g. such as electronic quantities, and/or said data representing the physical objects.

The terms "computer", "computer device" "control unit", "server" or the like as disclosed herein should be broadly construed to include any kind of electronic device with data processing circuitry, which includes a computer processing device configured to and operable to execute computer instructions stored, for example, on a computer memory being operatively connected thereto. Examples of such a device include: digital signal processor (DSP), a microcontroller, a field programmable gate array (FPGA), an application specific integrated circuit (ASIC), a laptop computer, a personal computer, a smartphone, etc.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

In embodiments of the presently disclosed subject matter, fewer, more and/or different stages than those shown in any one of FIG. 4, FIG. 5, FIG. 6, FIG. 7, FIG. 8, FIG. 9 and FIG. 10 may be executed. In embodiments of the presently disclosed subject matter, one or more stages illustrated in FIG. 4, FIG. 5, FIG. 6, FIG. 7, FIG. 8, FIG. 9, and FIG. 10 may be executed in a different order and/or one or more groups of stages may be executed simultaneously.

Figure 2A:
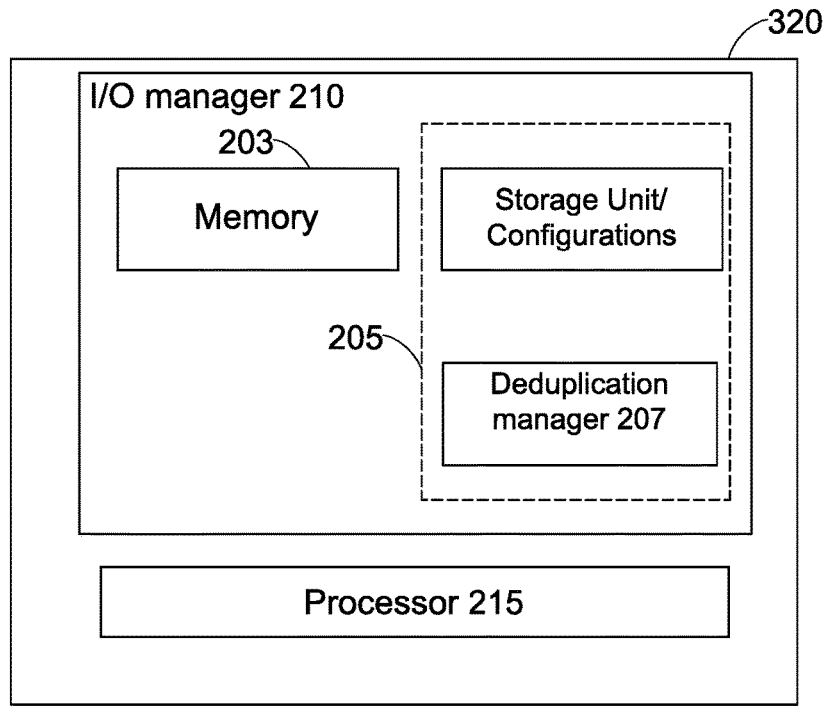
FIG. 2a is a schematic block-diagram illustration of a control unit according to examples of the presently disclosed subject matter.
Figure 2B:
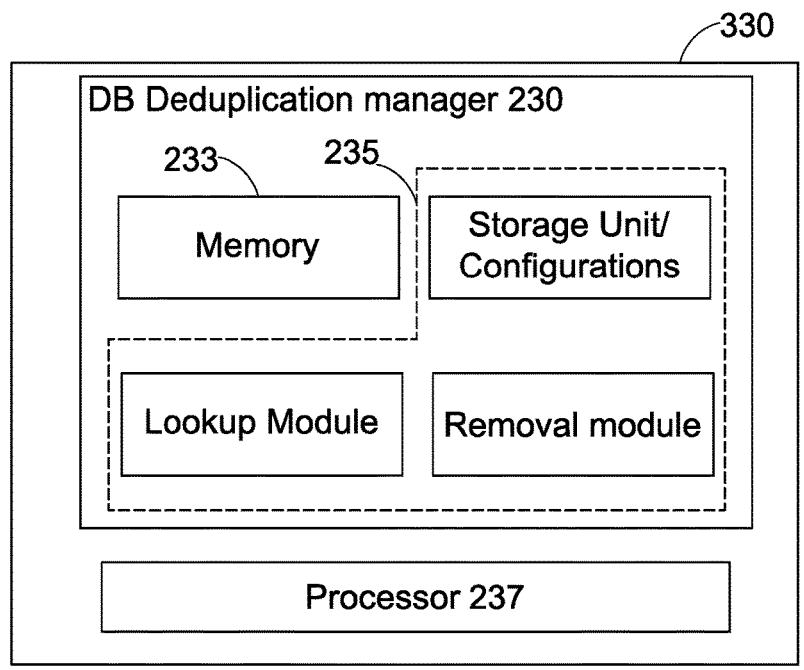
FIG. 2b is a schematic block-diagram illustration of another control unit according to examples of the presently disclosed subject matter.
Figure 3:
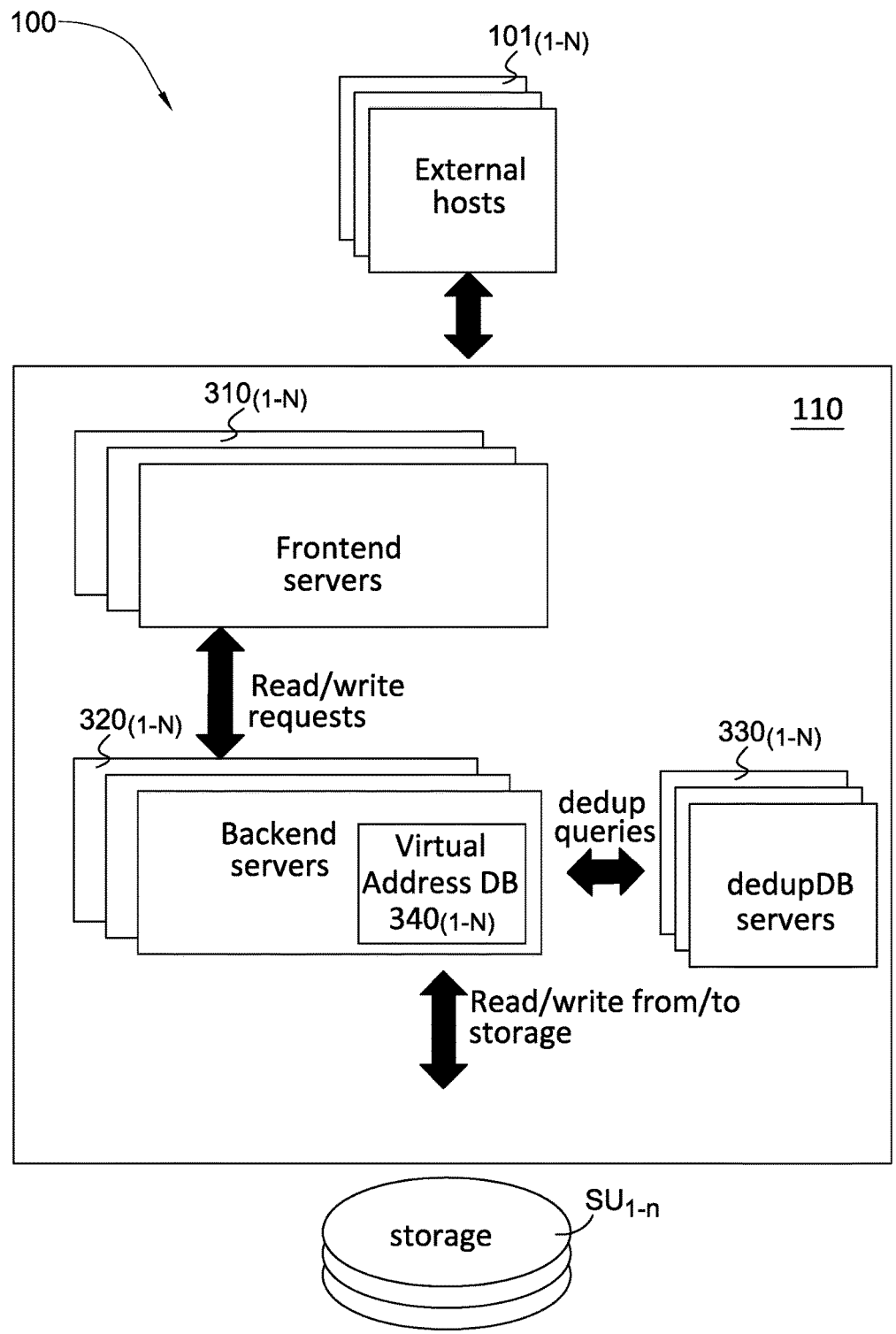
FIG. 3 is a schematic block-diagram illustration demonstrating distributed implementation of storage system 100 according to examples of the presently disclosed subject matter.

FIG. 1 to FIG. 3 illustrate various aspects of the system architecture in accordance with some examples of the presently disclosed subject matter. Elements in FIG. 1 to FIG. 3 can be made up of a combination of software and hardware and/or firmware that performs the functions as defined and explained herein. Elements in FIG. 1 to FIG. 3 may be centralized in one location or dispersed over more than one location. In other examples of the presently disclosed subject matter, the system may comprise fewer, more, and/or different elements than those shown in FIG. 1 to FIG. 3.

For example, some components of control unit 105 can be implemented as a separate unit in interface layer 110 or implemented on an external server or be otherwise operatively connected to the storage system for enabling management of I/O operations.

Throughout the description and the claims, reference is made to the term "logical unit" (or "LU" in abbreviation, also known as "volume"). The term logical unit is known in the art of computer storage, and the following definition is provided as a non-limiting example only for convenience purposes. Storage systems are often logically divided into logical units (LUs) to obtain a partitioned storage where each LU can be presented and accessed as a separate device. Each logical unit is identified by a respect logical unit number (LUN). For example, according to the small system computer interface (SCSI) standard, a SCSI initiator in a host originates an I/O command sequence that is transmitted to a SCSI target endpoint or recipient storage device. A logical unit is an entity within the SCSI target that responds to the SCSI I/O command.

The term "logical block address" (LBA) as used herein, relates to the basic reference unit which is used by external hosts to address I/O requests to the storage system. LBAs can be numerical and range from 1-n. A partly or an entirely overlapping LBA range (e.g., 1-n) can be used with multiple, different LUs (e.g., all the LUs) in the storage system, and therefore in order to reference a specific logical block, a reference to the LU with which the logical block is associated may be required. For simplicity, in some examples in the description the I/O requests may reference LBA and the existence of multiple LUs in the storage system is not mentioned. It would be appreciated that this omission is made with the intention of simplifying the description of the examples of the presently disclosed subject matter, and is not intended to limit the scope of the description. Therefore, it would be appreciated that examples of the presently disclosed subject matter contemplate a multi-LU storage system and that the LBAs which are referred to herein can be comprised of a combination of an LBA and a LU ID (e.g., LU number).

Throughout the description and the claims the terms "command" and "request" are meant to have the same meaning and may be used interchangeably.

Bearing the above in mind, attention is drawn to FIG. 1, which is a schematic block-diagram of a storage system, according to some examples of the presently disclosed subject matter. Storage system 100 (e.g. a highly available data-storage system) includes a physical storage space comprising one or more physical storage units ($SU_{1-n}$), each physical storage unit comprising one or more storage devices. Storage devices may be any one of Hard Storage devices (HDD) or Solid State Drives (SSD, comprising for example, a plurality of NAND elements), DRAM, non-volatile RAM, or any other computer storage device or combination thereof. Physical storage units ($SU_{1-n}$) can be consolidated in a single unit, or can be otherwise distributed over one or more computer nodes connected by a computer network.

Storage system 100 can further comprise interface layer 110 comprising various control units $105_{1-n}$ operatively connected to the physical storage space and to one or more hosts ($101_{1-n}$), and configured to control and execute various operations in the storage system (including input and/or output (I/O) operations). Various examples of control units are described in more detail below.

Interface layer 110 can be further configured to provide a virtual storage layer logically representing the physical storage space as well as the required mapping between the physical storage space and its respective logical representation. Different control units $105_{1-n}$ in interface layer 110 (where a control unit is implemented, in some examples, by a dedicated computer device e.g. a dedicated computer server device) can be assigned for managing the operation of a certain area within the physical storage space (e.g. an area comprising for example one or more designated physical storage units or part thereof).

Communication between hosts ($101_{1-n}$) and interface layer 110, between interface layer 110 and storage units ($SU_{1-n}$) and within interface layer 110 (e.g. between different control unit $105_{1-n}$) can be realized by any suitable infrastructure and protocol. Hosts ($101_{1-n}$) can be connected to the interface layer 110 directly or through a network (e.g. over the Internet). According to one example, communication between various elements of storage system 100 is implemented with a combination of Fiber Channel (e.g. between hosts and interface layer 110), SCSI (e.g. between interface 110 and storage units) and InfiniBand (e.g. interconnecting different control units in interface 110) communication protocols.

FIG. 2a is a schematic block-diagram showing some components of a control unit according to some examples of the presently disclosed subject matter. Control unit 105 can be implemented on a computer device comprising processing circuitry. The processing circuitry comprises or is otherwise operatively connected to one or more computer processors 215 for executing operations. The processing circuitry can further comprise by way of example, I/O manager 210 configured to handle I/O requests received, for example, from host computers $101_{1-n}$. One example of a control unit is BE servers 320 described below.

According to some examples of the presently disclosed subject matter, I/O manager 210 can comprise or be otherwise operatively connected to memory 203 and a storage unit 205, the storage unit stores the configurations and/or logic which are used by the I/O manager 210. According to some examples, processor(s) 215, memory 203 and storage unit 205 of the processing circuitry are utilized when operating I/O manager 210 to perform operations as known in the art and as disclosed herein below. According to some examples, I/O manager 210 comprises (e.g. in storage unit 205) or is otherwise operatively connected to deduplication manager 207 configured to execute operations related to deduplication as described below with reference to FIGS. 4 to 10.

I/O manager 210 can be implemented as component distributed over more than one BE server. According to some examples, each BE server can comprise a respective I/O manager 210, while according to other examples, one I/O manager may be accessible and operable by more than one BE server. According to some examples, some components of control unit 105 can be implemented as a separate unit in interface layer 110 or implemented on an external server or be otherwise operatively connected to the storage system for enabling management of I/O operations. For example, deduplication manager 207 can be implemented as a separate unit operatively connected to I/O manager 210.

As mentioned above, the presently disclosed subject matter contemplates a distributed storage system with an interface layer 110 configured with multiple control units ($105_1$ to $105_n$ as indicated in FIG. 1). As would be apparent to any person skilled in the art, principles described with respect to a single control unit can likewise apply to two or more control units in system 100.

FIG. 3 is a schematic block-diagram demonstrating distributed implementation of storage system 100 according to examples of the presently disclosed subject matter. According to some examples, control units 105 include different types of computer devices including for example, a plurality of front-end servers 310 (abbreviated "FE" servers), a plurality of back-end servers 320 (abbreviated "BE" servers) and a plurality of deduplication database servers 330 constituting a deduplication database (abbreviated "DDB"). Each one of the FE servers, the BE servers and DDB servers can be implemented on a single computer hardware device or can be distributed across a plurality of discrete computer hardware devices. Notably, according to other configurations, a single server device is configured to perform the functionalities described above with respect to both FE server and BE server, and in some cases also the functionalities of DDB server.

According to some examples of the presently disclosed subject matter, the BE servers 320 handle requests received from the FE severs 310. BE servers 320 are adapted to write received write data to the storage ($SU_{1-n}$), read data from the storage ($SU_{1-n}$) and hold metadata which allows reads and writes. This metadata can also include metadata which is related to deduplication.

According to examples of the presently disclosed subject matter, the logical address space of the storage system 100 is logically partitioned so that for every logical address, there is at least one BE server 320 which is responsible for that address and assigned for handling read and write requests directed to that address. Further by way of example, FE 310 and BE 320 servers can hold translation tables or implement translation functions which map from logical address to the BE server which is responsible for that address. Thus, given a logical address, an FE server 310 or a BE server 320 can determine the BE server 320 which is responsible for that address. In some examples (e.g. for the purpose or redundancy) two or more BE servers can be assigned to handle I/O requests to the same storage area. In some examples, there are at least two BE servers that are each assigned to handle I/O requests to respective non-overlapping storage areas, such that one BE server cannot access the storage area assigned to the other BE server, and vice versa.

The FE servers 310 can be configured to receive I/O requests from external hosts 101 and responsive to receiving an I/O request, the receiving FE server 310 can be configured to determine with which address (LU,LBA) the I/O request is associated. The FE 310 can use address mapping tables (or mapping functions) to determine, based on the logical address referenced in the I/O request, to which BE server 320 from the plurality of BE servers to address the I/O request.

The DDB stored on the DDB servers 330 holds mappings from each one of a plurality of hash values, calculated for respective write data segments received in write requests, to respective virtual addresses which is where a pointer to the storage location of the respective write data is found.

According to some examples, there is a certain range or space of possible hash value which can be computed for write data in the system, and the range or space of such a possible hash value can be partitioned such that for any (possible) hash value there is at least one DDB server 330 which is responsible for it. Thus, given a certain hash value calculated for a certain write data, there is a DDB server 330 which is responsible for storing a respective entry enabling to associate between the write data and one or more respective virtual addresses.

By way of example, DDB 330 can comprise a database (DB) deduplication manager 230 configured to execute, at the DDB, operations related to deduplications. As illustrated in FIG. 2*b*, DB deduplication manager 230 can comprise or be otherwise operatively connected to a processing circuitry comprising one or more processors 237, memory 233 and a storage unit 235 which stores the configurations or logic which are used by DB deduplication manager 230. According to examples, processor(s) 237, memory 233 and a storage unit 235 are utilized when operating DB deduplication manager 230 to perform operations as known in the art and as disclosed herein below.

By way of example, DB deduplication manager 230 can comprise (e.g. in storage unit 235) a lookup module and a removal module. The lookup module is configured to be responsive to a call (received for example from an I/O manager 210 of a BE server) to execute operations related to checking if an input hash value received with the call is already mapped to a virtual address reference entry.

As further described below, according to examples of the presently disclosed subject matter, the hash value, calculated for a write data, is divided according to a predefined division rule, into two parts; value H1 and value H2. If it is determined (e.g. by the lookup module) that one hash value part H1 is already mapped to the other hash value part H2 in the DDB, an existing virtual address reference key, referencing a virtual address entry to which the hash values are mapped, is returned to the relevant BE server 320 that sent the query to the deduplication database (DDB) for further processing.

Otherwise, if a virtual address reference key which is already associated with the input hash value part H1 and hash value part H2 is not found in the DDB, the DDB can be configured to add (e.g. by the lookup module, which can include an "insert" functionality) an entry mapping a virtual address reference key to the input hash value, and return an acknowledgement to the BE server 320 that issued the query.

The removal module is configured to be responsive to a call (received for example from an I/O manager 210 of a BE server) to execute operations related to removing an entry from the deduplication database. As explained below by way of example, the DDB entry removal operation can be executed when the reference counter of a respective entry in the deduplication database reaches zero.

According to some examples of the presently disclosed subject matter, BE servers 320 hold mapping data for mapping from logical addresses to respective virtual addresses (including for example a list of one or more virtual address). According to some examples, the mapping between logical addresses and virtual addresses and between virtual addresses and respective data location in the physical storage is stored in a virtual address database 340.

BE servers 320 can be configured to hold virtual address database 340, which can be implemented in some examples as a distributed component which is distributed over a plurality of BE servers 320, each directly responsible for part of the database 340. According to other examples virtual address database 340 is implemented and distributed over a plurality of designated servers (other than BE servers 320) being operatively connected to BE servers 320. As mentioned above, according to some examples, BE servers 320 comprises I/O manager 210 configured to handle I/O related operations at the BE server. In case virtual address database 340 is implemented separately from BE servers, the functionality of I/O manager 210 can be distributed such that part is implemented by the BE server and part by a respective virtual address database server associated therewith.

As will be described in further detail below, according to some examples of the presently disclosed subject matter, each virtual address entry stored at the virtual address database 340 includes a pointer, which either points to a storage location in the physical storage space or to another virtual address entry.

Having provided a high level description of the various components of the storage system, more details are now provided with respect to operation of the storage system.

Figure 4:
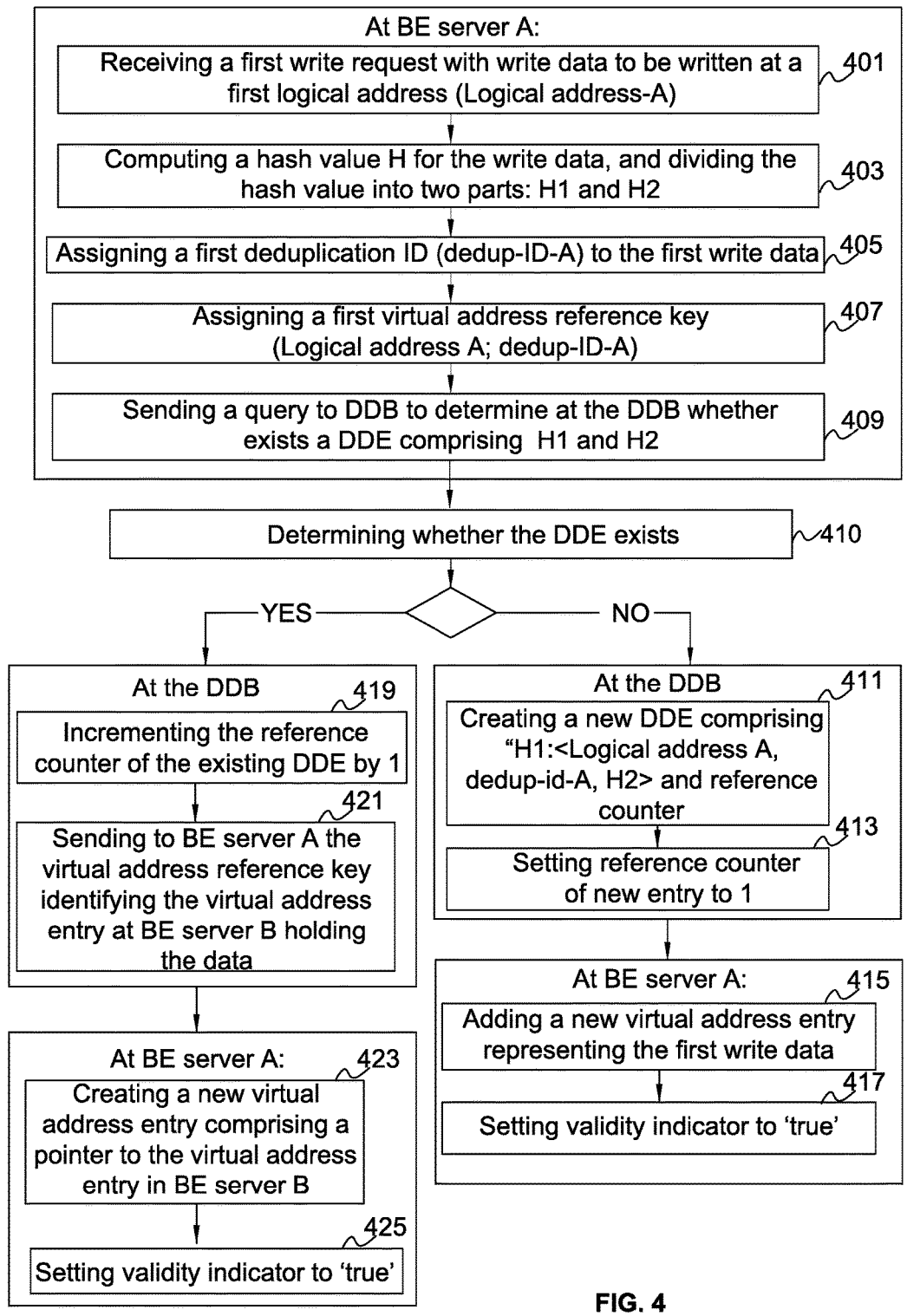
FIG. 4 is a flowchart illustration of operations carried out during data write according to examples of the presently disclosed subject matter.

FIG. 4 is a flowchart showing a sequence of operations performed during data write, according to some examples of the presently disclosed subject matter. Operations described with reference to FIG. 4 (as well as to FIGS. 5 to 10 below) can be executed for example, by interface layer 110 and more specifically by one or more control units 105 (including for example BE servers 320 and DDB servers 330) described above. It should be appreciated, that while some operations are described with reference to components of system 100 and its components presented above, this is done by way of example only, and this should not be construed to limit the operations to being implemented on such components alone.

The flow starts with the receipt of a first write request at a BE server in storage system 100 (block 401). The write request includes a first write data that is associated with a first logical address (i.e. addressed to be written at the first logical address, e.g. LU, LBA). Note that the term "first" as used throughout the specification, figures and claims does not mean the very first write request, write data, LBA, hash value, deduplication ID, virtual address entry, virtual address reference key, pointer, etc.; rather it is used to distinguish from a "second" (a different) write request, "second" (different) write data, "second" (a different) LBA, etc.

As mentioned above, according to some examples, the write request is first received by one of the FE servers 310, which determines to which BE server 320 the write request should be directed, for example, according to the address which is referenced in the request. The FE server which receives the write request determines in the domain of which BE server(s) the LBA(s) referenced in the request fall, and distributes the write data to the appropriate one or more BE servers. It would be appreciated that according to some examples, FE servers can also distribute incoming write requests or parts of incoming write requests among themselves. Herein below, a BE server which is responsible for handling a certain write request, is referred to in general as the "the relevant BE server". By way of example, in the description related to FIG. 4, the relevant BE server is denoted as "BE server A".

A first hash value H is computed based on the first write data (block 403). According to some examples, BE server A, which is responsible for the first logical address with which the first write data is associated, receives the first write data from the FE server 310 and computes the first hash value based on the first write data. Different hash functions and computations can be used for computing the hash value based on the write data.

According to some examples of the presently disclosed subject matter, the calculated first hash value H is a strong hash value, characterized by strong collision resistance. For example a strong hash value can include a 192 bits hash, a 256 bits hash, or greater. According to some examples, the term "strong hash value" is meant to include any hash value calculated from a certain bit number where the probability of two different input data to provide an identical hash value output is smaller than the probability of an undetected (silent) data corruption when reading the input data from a storage medium (e.g. SSD or HDD).

The calculated hash value is divided into two parts, H1 and H2, according to a predefined division rule, such that H is the bit-concatenation of H1 and H2 (block 403). By way of example, assuming H is a 196 bit hash value, H1 can encompass the first 40 bits while H2 encompass the remaining 156 bits. In other examples, other division rules can be used instead.

A first deduplication ID (referred by way of example "dedup-ID-A") is assigned to the first write data (block 405). As mentioned above, according to examples of the presently disclosed subject matter, deduplication IDs are assigned such that for a certain predefined logical block address range, each deduplication ID is unique. In one example, deduplication IDs are assigned such that for each single logical block address each deduplication ID is unique. This way the duplication ID serves to identify different versions of data all assigned to the same logical block address. In other examples, the deduplication IDs are assigned such that they are unique within a range of more than one logical block address. Here the duplication ID serves to identify different versions of data all assigned within the same range of logical block addresses. For simplicity, in the following description it is assumed that deduplication IDs are assigned such that for each single logical block address each deduplication ID is unique, but this does not intend to limit the scope.

As mentioned above, either as part of the LBA or as a separate indicator, the LU ID to which a given LBA belongs can also be used as part of the virtual address reference key. Thus for example, in a storage system that has multiple LU, where in a different LU there is at least some overlap with other LU(s) LBAs, the virtual address reference can also include an identifier of the LU to which the LBA belongs. In such cases, the deduplication IDs are assigned such that within the scope of any LBA of a given LU, each deduplication ID is unique.

At block 407, a first virtual address reference key is assigned to the first write data. A virtual address reference key is comprised from the combination of the first logical address (referred by way of example: "logical address-A"), which is the destination address of the first write data and the first deduplication ID which was assigned to the first write data.

At blocks 409 and 410, it is determined whether the deduplication database (DDB) already includes a deduplication database entry (DDE) which is associated with the first hash value. More specifically, the relevant BE server 320 sends a query to the DDB (e.g. sent as a call to the lookup module), the query includes H1, H2 (block 409). In some examples the query can further comprise the first logical data address ("logical address-A"), and the assigned first deduplication ID ("dedup-ID-A"), to make them available in case a new DDE needs to be generated, as described further below. According to some examples, operations described above with reference to blocks 401 to 409 are executed by I/O manager 210 (e.g. with the help of deduplication manager 207) of the relevant BE server.

Responsive to the query, the DDB executes a search, searching for an entry with a key that is equal to the hash value part H1 (block 410). Assuming DDB entries are provided in hash table format, H1 can be a hash key referencing a data structure (e.g. a hash value list) comprising H2 as well as additional data as described below.

If there is already a DDE for a hash value with a key that is equal to hash value part H1, it is further determined whether the corresponding value of the entry comprises a value which equals to a second hash value part H2. According to some examples, if a DDB entry that includes both a key and the corresponding value that match H1 and H2 respectively, is found, DDB can return a virtual address reference key of a virtual address entry referenced by the existing DDE. The virtual address reference key comprises for example the logical address and deduplication ID of the respective data. The uniqueness of hash values in the DDB can be made such that practically for a given hash value H (e.g. strong hash as explained above) divided into H1 and H2, there can be only a single entry whose key is equals H1 and whose value contains H2.

Still further by way of example, if there is no such entry, DDB can return a response (e.g. a null value or some other response in another format) indicating that the searched data has not been found. In whichever format the response from the DDB is provided, the relevant BE server can be configured (e.g. by I/O manager 210) to conclude, based on the response, whether or not there is an entry in the DDB which is already associated with values H1 and H2 of the first hash value H. In the event that it is determined that there is no existing entry in the DDB for the first hash value H, the following is executed:

i. A new deduplication entry (DDE) for the first hash value H is added to the DDB (block 411). By way of example, the new DDE includes a hash key which equals H1 (one part of first hash value H) and a hash value comprising: logical address of the first write data, first deduplication ID and H2 (second part of first hash value H). For a first write data 'A', the new DDE can be stored in a key:<value> hash table format as follows: "H1: <logical address-A; deduplication-ID, H2>". Notably, the lookup module can operate as a lookup and insert module, where insert operations of a new DDE are executed in case an existing DDE is not found in the DDB.

ii. The new DDE also comprises a reference counter set to indicate that there is one respective logical address which is associated with the new DDE, e.g. reference counter=1 (block 413).

Operations described above with reference to block 411 and 413 can be executed for example by DB deduplication manager 230.

iii. Responsive to a notification that a DDE associated with H1 and H2 does not exist, a new virtual address entry (herein "first virtual address entry") for the first write data is added to the virtual address database 40, which is associated with the relevant BE server (block 415). According to some examples, the first virtual address entry is associated (e.g. linked by a logical reference) to the logical address of the first write data. The first virtual address entry also comprises the deduplication ID and H1. A pointer pointing from the first virtual address entry to a location in the physical storage space where the first write data is stored, is added to the first virtual address entry. Notably, as part of the processing of the write request, the write data is also written to the physical storage at the designated location. Notably, it is not necessary that the virtual address entry stores H2, thus reducing the storage space consumed by each entry.

iv. The first virtual address entry further comprises a validity indicator (e.g. 'is_last' indicator) for indicating whether the first virtual address entry is pointing to the most updated version of data associated with the respective logical address. The validity indicator shows when there is more than one virtual address entry associated with the same logical address, which of the entries should be accessed when responding to a read request. At block 417 validity indicator (is_last) of the first virtual address entry is set to true. In some examples, the first virtual address entry is stored at storage location within the storage area assigned to BE server A.

Figure 4A:
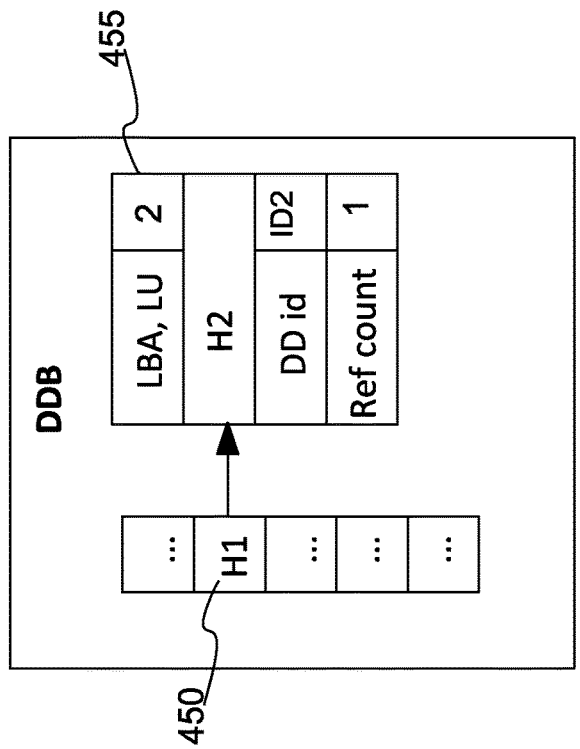
FIG. 4a is a schematic illustration showing by way of example a possible state of virtual address database and of deduplication database following the processing as described with reference to blocks 401 to 410 and 411 to 417 of FIG. 4.
Figure 4A:
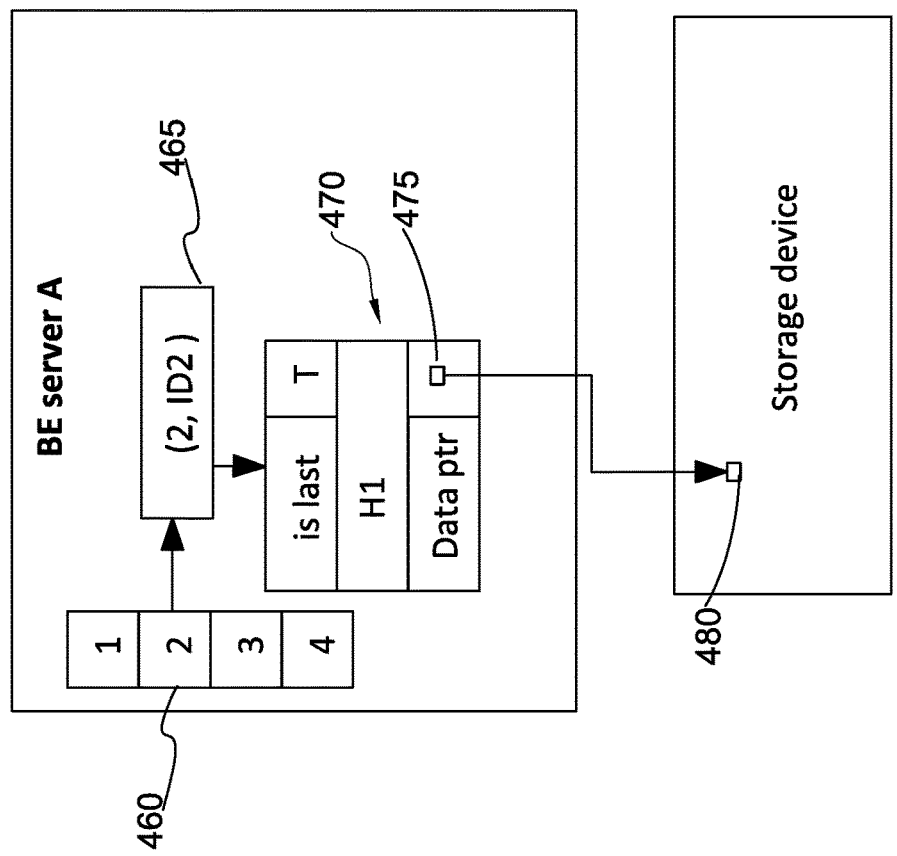

FIG. 4a is a schematic illustration showing by way of example the state of a virtual address database and the state of the DDB following the processing of a write request according to blocks 401 to 410 and 411 to 417. At the DDB there is now a DDE representing the first write data received with the first write request. The DDE includes a key 450 which equals H1 and a value entry 455. The value entry comprises: the logical address of the first write data (say, LU, LBA: '2'); H2 (the second part of the hash value of the first write data); and a deduplication ID (say, ID2). The value entry further comprises a reference counter, which equals 1, and indicates the number of virtual address entries which are currently associated with the first write data.

At the virtual address database associated with BE server A, a virtual address entry 470 with a respective virtual address entry key 465 has been added. Virtual address entry key 465 is associated with the respective logical address 460 ('2') of the first write request. The virtual address entry key comprises also the deduplication ID ('ID2'). The virtual address entry 470 includes H1, and a pointer 475 pointing to the location at the physical storage space 480 where the first write data is stored. The virtual address entry further comprises a validity indicator ('is_last') which is set to equal true, indicating that that any read request addressing logical address '2' should return the data at the physical storage referenced by the pointer of virtual address entry 470.

Reverting back to block 409, In the event that it is determined that there is an existing DDE in the DDB for the first hash value H, the following is executed:

i. The reference counter of the existing DDE is incremented to indicate that there is now an additional logical address, which is associated with the same data (block 419).

ii. The virtual address reference key, which is associated with the existing DDE and identifies an existing virtual address entry at another BE server (denoted below as "BE server B") which is already associated with the first write data, is sent to BE server A (block 421). Operations described above with reference to block 419 and 421 can be executed for example by DB deduplication manager 230.

iii. At BE server A, a new virtual address entry is created and added to the virtual address database (block 423). The new virtual address entry comprises a pointer pointing to an existing virtual address entry at BE server B, which points in turn to a location in the physical storage (assigned to the BE server B) where a copy of the first write data is stored. The existing virtual address entry is identified based on its virtual address reference key received from DDB.

The H1 value of the first hash value is also added to the first virtual address entry. H1 is needed in order to enable sending decrement requests to DDB as described below with reference to FIGS. 5 and 6. As mentioned above, it is not necessary that the virtual address entry stores H2, thus reducing the storage space consumed by each entry.

At block 425 a validity indicator (is_last) of the new virtual address entry at BE server A is set to true. As a result, incoming read requests to BE server A are redirected to the virtual address entry at BE server B, where the data can be found.

According to some examples, operations described above with reference to blocks 423 to 425 are executed by I/O manager 210 of the relevant BE server (BE server A).

Figure 4B:
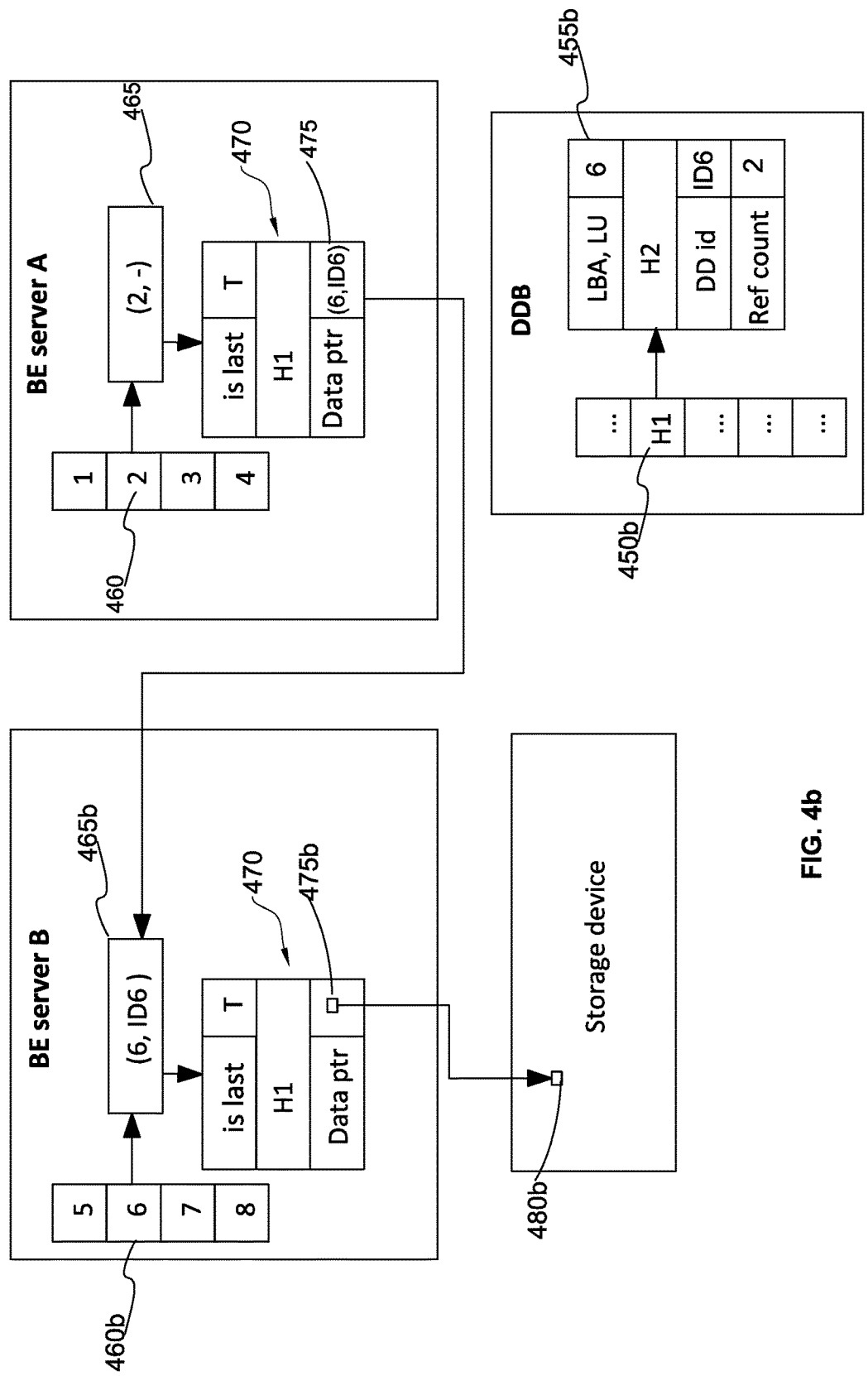
FIG. 4b is a schematic illustration showing by way of example a possible state of virtual address database and of deduplication database following the processing as described with reference to blocks 401 to 410 and 419 to 425 of FIG. 4.

FIG. 4b is a schematic illustration showing by way of example the state of a virtual address database and the state of the deduplication database following the processing of a write request according to blocks 401 to 410 and 419 to 425.

DDB comprises an existing DDE which includes a key 450b which equals H1 and a value entry 455b. DDE 450b is associated with a copy of the first write data of the first write request. The existing DDE value entry 455b comprises:

H2; the logical address 455b (LU, LBA: '6') of the BE server (BE server B) that stores a virtual address entry associated with a copy of the first write data; deduplication identifier ('ID6') that identifies the virtual address entry stored at BE server B; a reference counter which has been updated to equal 2, indicating that there are two BE servers that are referencing the first write data, which is associated with virtual address entry 470b stored at BE server B.

At BE server A, a virtual address entry 470 with a respective virtual address reference key 465 has been added to the virtual address database. Virtual address reference key 465 is associated with the respective logical address 460 ('2') of the first write request. Note, that the virtual address reference key 465 does not comprise the deduplication identifier. Virtual address entry 470 includes H1, and a pointer 475 pointing to (referencing) virtual address reference key 465b stored at BE server B, identifying a virtual address entry, which points in turn (by pointer 475b) to the location in the physical storage 480b where the first data is stored. Virtual address entry 470 further comprises a validity indicator ('is_last'), which is set to equal true, indicating that any read requests to the logical address '2' should be directed to virtual address entry 470b and from there to read from storage location 480b. Notably, a read request to logical address '6' would also be directed to virtual address entry 470b and from there to the same physical storage location.

It would be appreciated that hosts $101_{(1-n)}$ use logical addresses (LBAs) to address IOs to the storage system 100, e.g., in order to read/write data from/to the system. Thus, any logical block address can only point to a single data segment in the storage device (physical or virtual). When certain write data is first stored in the storage system, the metadata for that write data can point to the actual storage location (physical or virtual) of the write data. The metadata of subsequent yet identical write data can point to the address in which the data was previously written. If this is the case, then it implies that a single LBA may point to more than one data item, since the logical address must continue pointing to the data item as long as other addresses point to it, even if the logical address is rewritten and its pointer needs to point to another location where the logical addresses updated write data is stored. Examples of the presently disclosed subject matter which are disclosed herein below implement virtual addresses and store certain metadata in databases in order to address this issue.

Also, it should be noted, that according to examples of the presently disclosed subject matter, a virtual address (or a virtual address entry, which is the system data which represent a virtual address) exists in the system so long as at least one virtual address points to it, including the virtual address itself. This means that a virtual address, say a first virtual address, is maintained as long as it is holds the latest data of a certain LBA, say a first LBA, or when there is at least one other virtual address, say a second virtual address, which is associated with another LBA, say a second LBA, where it is the latest data (of the second LBA) and which references the first virtual address in its pointer. This means that the second virtual address entry is associated with the same write data as the first virtual address entry, and although the first virtual address entry is no longer associated with the latest write data within the scope of the first LBA, the second virtual address entry which points to the first virtual address entry is still the latest (i.e. most updated) version within the scope of the second LBA, and thus the metadata which is included in the first virtual address entry needs to be maintained.

Figure 5:
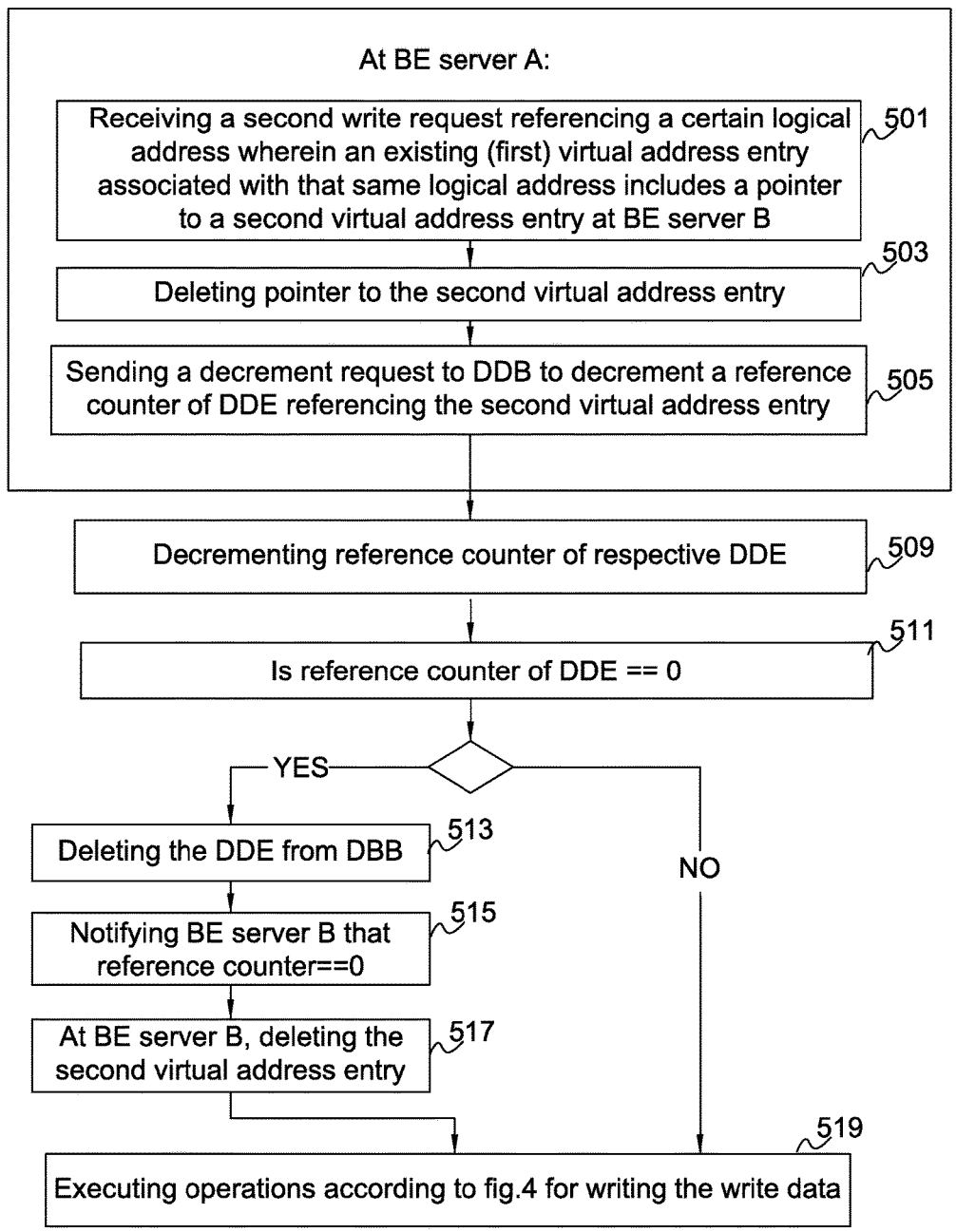
FIG. 5 is a flowchart illustration of operations carried out during data write according to examples of the presently disclosed subject matter.

Reference is now made to FIG. 5 which is a flowchart of operations carried out according to some examples of the presently disclosed subject matter. FIG. 5 exemplifies operations which are executed when a (second) write request is received at a BE server (BE server A), where the second write request references a logical address and where responsive to a previous (first) write request addressing that same logical address, a virtual address entry was added, the virtual address entry comprises a pointer pointing to another virtual address entry stored at another BE server (BE server B). A procedure leading to such a state was described above with reference to FIG. 4 blocks 401 to 410 and 419 to 425. BE server A in FIG. 4b shows a schematic illustration of this scenario.

For brevity and simplicity of the description, operations related to the assignment of a write request to the relevant BE server, which are described above with reference to block 401 are not repeated.

At block 501, a second write request is received at BE server A, the second write request addressing a logical address that is associated with a first virtual address entry comprising a pointer pointing to a second virtual address entry which is associated with a different BE server (BE server B). The second virtual address entry is pointing to the location at the physical storage space where a copy of the first write data is stored. In some examples, the BE server which is responsible for the address in the second write request determines (performed for example by I/O manager 210) that the address is already associated with an existing virtual address entry in the virtual address database.

At block 503 the pointer from the virtual address entry at BE server A to the second virtual address entry at BE server B, is deleted. A request to decrement the reference counter of a respective DDE is sent from BE server A to the DDB (block 505). The data sent with the request includes for example: H1, the logical address associated with the second virtual address entry and the deduplication identifier assigned to the second virtual address entry (LU, LBA '6' and'ID6' of pointer 475 in FIG. 4b). This combination of data provides a unique identifier for identifying the respective entry in the DDB.

Responsive to the request, DDB finds the respective entry and decrements its respective reference counter by one (block 509). If the reference counter indicates that there is no other address which is associated with the DDE (e.g. the reference counter equals 0), DDB removes the DDE from the DDB; e.g. with the help of removal module (blocks 511, 513). DDB sends a message to BE server B, notifying that the DDE has been deleted (block 515). Responsive to the message received from DDB, BE server B deletes the second virtual address entry (block 517). Operations described with reference to block 509 to 515 can be performed for example by deduplication manager 230.

In addition, the operations described above with reference to blocks 403-425 are repeated in order to write the new write data of the second write request. This includes determining whether or not the write data of the second write request is already associated with a respective entry in the DDB and proceeding with updating the DDB and the deduplication database accordingly.

Figure 6:
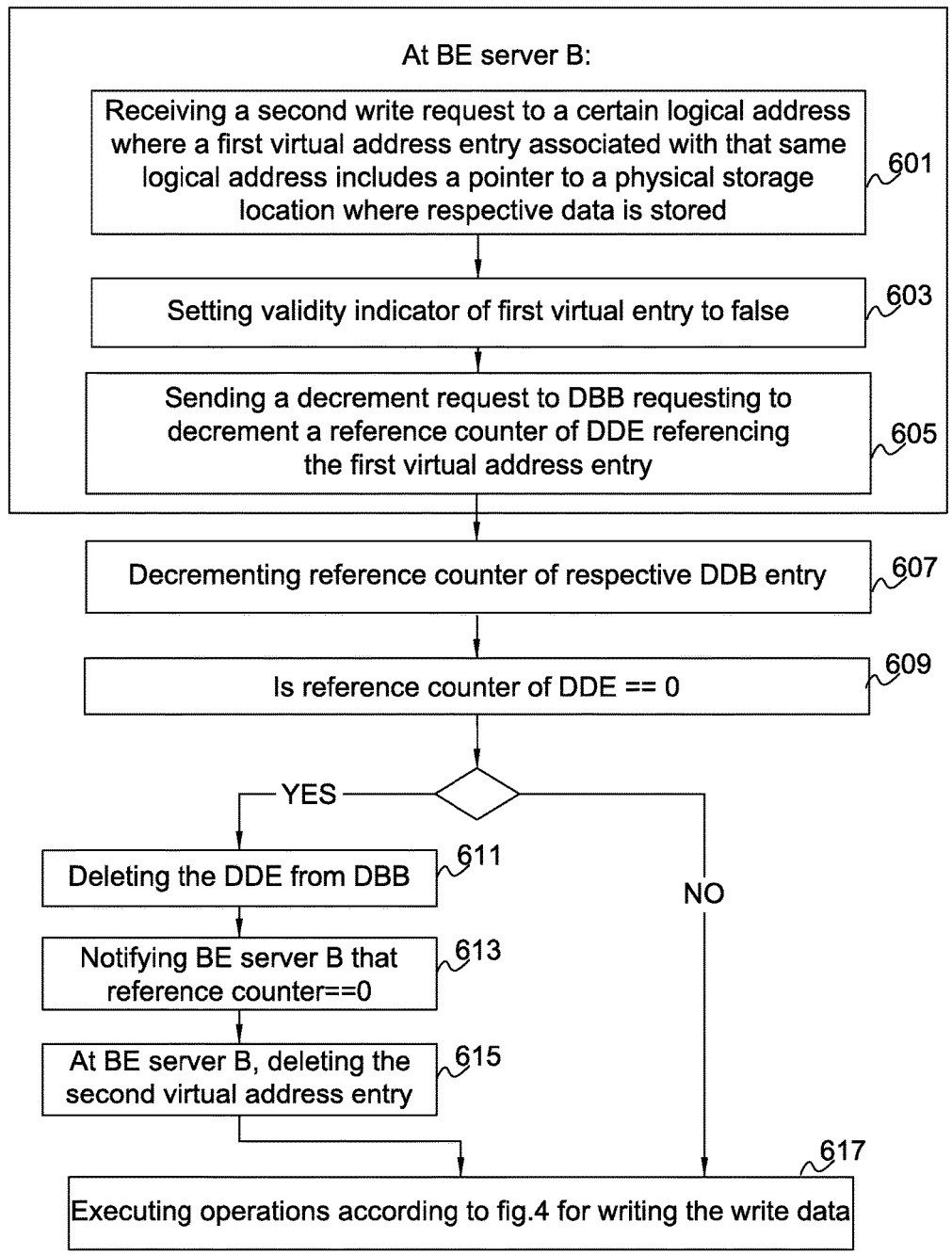
FIG. 6 is a flowchart illustration of operations carried out during data write according to examples of the presently disclosed subject matter.

Referring now to FIG. 6 which is a flowchart of operations carried out according to some examples of the presently disclosed subject matter, FIG. 6 exemplifies operations which are executed when a (second) write request is received at a BE server (BE server B), where the write request references a logical address and the BE server holds a virtual address entry added responsive to a previous write request addressing that same logical address. BE server B in FIG. 4b presents a schematic illustration of this scenario.

For brevity and simplicity of the description, operations related to the assignment of a write request to the relevant BE server, which are described above with reference to block 401 are not repeated in the following parts.

At block 601, a second write request is received at a BE server (BE server B), the second write request addressing a logical address that is associated with a first (existing) virtual address entry. The first virtual address entry has been created responsive to a previous (first) write request addressing the same logical address as in the second write request. The first virtual address entry comprises a pointer pointing to a location at the physical storage space where the write data received in the earlier write request is stored. The BE server which is responsible for the address in the second write request can determine (performed for example by I/O manager 210) that the address is already associated with an existing virtual address entry in the virtual address database.

At block 603 a validity indicator (e.g. "is_last") of the first virtual address entry is changed to false. As new data has now been received, a read request should be directed to read the new, and not the older data, referenced by the first virtual address entry.

At block 605 a request to decrement the reference counter of a respective DDE referencing the first (existing) virtual address entry is sent from BE server B to the DDB. The request includes data from the first virtual address entry, including for example: H1, the logical block address (indicated by '6' in FIG. 4b) and the deduplication identifier (indicated by 'ID6' in FIG. 4b). This combination of data provides a unique identifier for identifying the respective entry in the DDB.

Responsive to the request, DDB finds the respective DDE and decrements its respective reference counter (block 607). If the reference counter indicates that there is no address that is associated with the entry (e.g. the reference counter equals 0), DDB removes (performed for example by removal module in DB deduplication manager 230) the entry from the DDB (block 611). DDB communicates back to BE server B that the respective entry has been removed, i.e. the respective data is no longer used by any of the BE servers (block 613). Operations described with reference to block 607 to 613 can be performed for example by deduplication manager 230.

At block 615, responsive to a message received at BE server B that indicates that the DDE has been removed, the first virtual entry is removed as well. Otherwise, if another BE server holds a virtual address entry comprising a pointer pointing to the first virtual address the first virtual address entry is not removed.

In addition, the operations described above with reference to blocks 403-425 are repeated in order to write the new write data of the second write request. This includes determining whether or not the write data in the second write request is already associated with a respective DDE and proceeding with updating the DDB and the deduplication database accordingly.

Figure 6A:
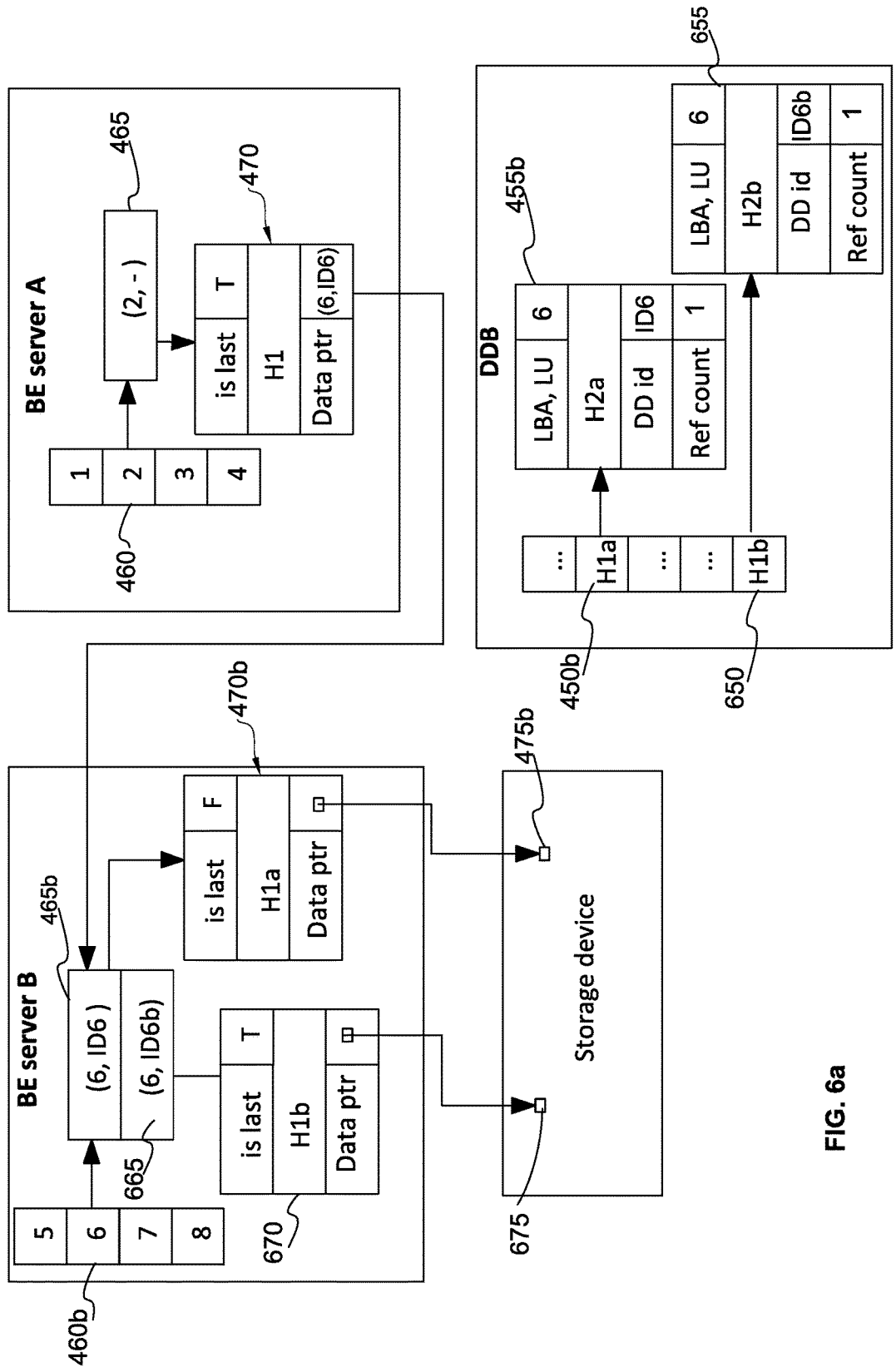
FIG. 6a is a schematic illustration showing by way of example a possible state of virtual address database and of deduplication database following the processing as described with reference to blocks 601 to 611 of FIG. 6 and blocks 401 to 410 and 419 to 425 of FIG. 4.

FIG. 6a is a schematic illustration showing by way of example a possible state of virtual address database and of DDB following the processing of a write request according to blocks 601 to 611, blocks 401 to 410 and blocks 419 to 425 in FIG. 4. FIG. 6a demonstrates a status where a third virtual address entry is added, which is one possible result when starting from the status illustrated in FIG. 4b.

DDB includes two deduplication entries keys (450b and 650) associated with the same logical address ('6') where each entry references a different virtual address entry, each corresponding to a different write data. DDE 450b is associated with a "first" write data received in a first write request and DDE 650 is associated with a "second" write data received with the second write request. Accordingly, each one of DDE 450b and 650 comprises different H1 and/or H2 values. Each one of DDE 450b and 650 comprise a value entry, 455b and 655, respectively. Each value entry comprises a different deduplication identifier (ID6 and ID6b), each identifier, identifying a respective virtual address entry, where both identifiers are associated with the same logical address ('6').

The reference counter at DDE 455b has been decremented by 1 and now equals 1. The reference counter of DDE 655 has been incremented by 1 and now equals 1 as well.

BE server B comprises two virtual address entries which are both associated with the same logical address (460b; '6') but each pointing to different physical storage locations. The validity indicator of virtual address entry 670, which points to the most recently received write data (at physical storage space 675), is marked 'true', while the validity indicator of virtual address entry 470b (pointing to storage space 475b) is marked 'false'. Thus, a read request address to logical address '6' is directed to read the data stored in association with virtual address entry 670, marked as 'true'.

At BE server A, virtual address entry 470 points to virtual address entry 470b (or more specifically to virtual address reference key 465b of virtual address entry 470b). The validity indicator of virtual address entry 470, which points to the most recently received write data written to logical address '2', is marked 'true'. A read request to logical address '2', is directed to virtual address entry 470 at BE server A and then redirected to virtual address entry 470b at BE server B.

Notably, in a scenario where DDB does not comprise an existing DDE referencing the same write data as in the second write request, the resulting status would be different than the one illustrated in FIG. 6a, as described with reference to blocks 411 to 417 in FIG. 4.

Figure 7:
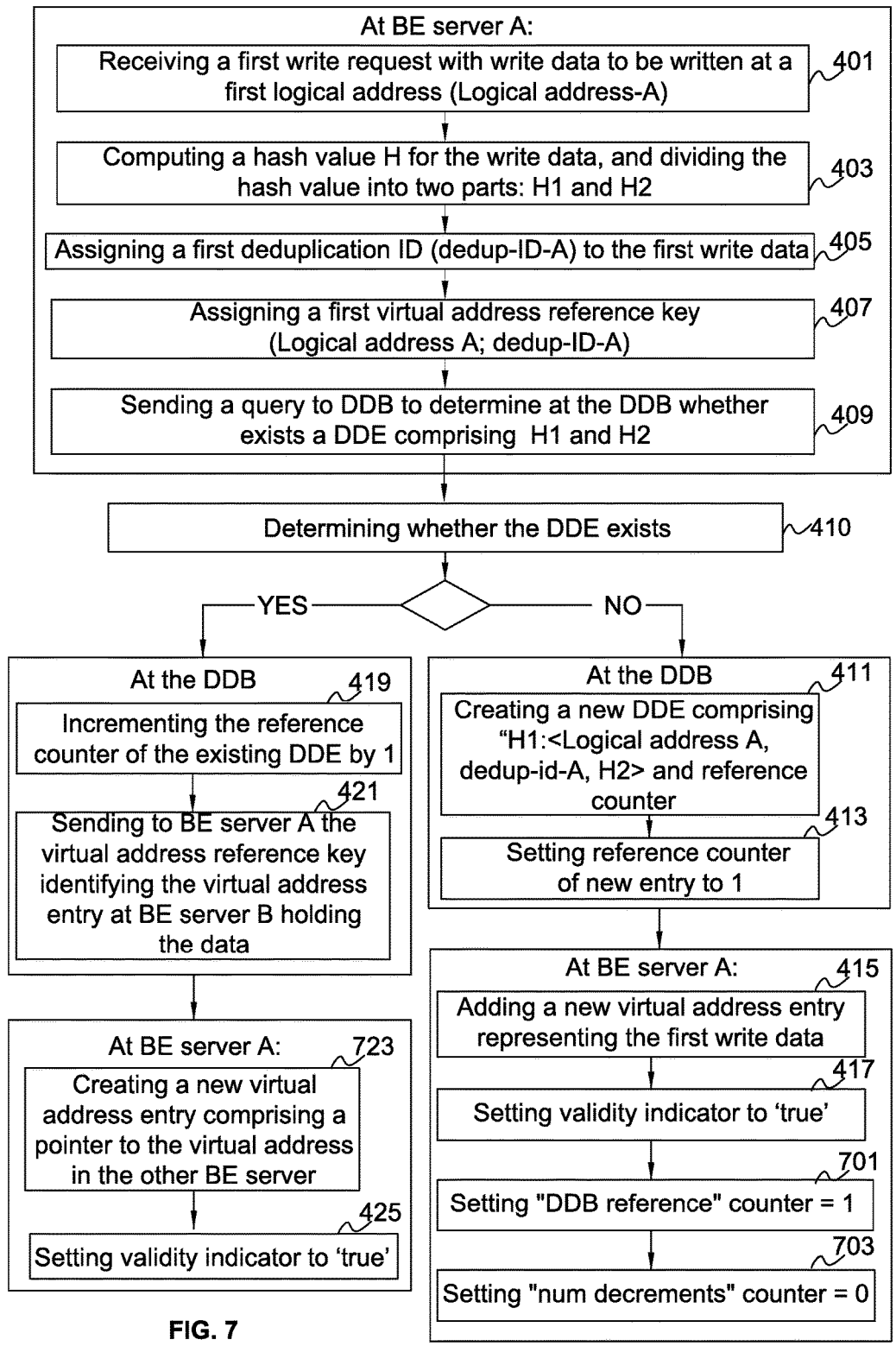
FIG. 7 is a flowchart illustration of operations carried out during data write according to examples of the presently disclosed subject matter.

Proceeding to FIG. 7, this illustrates a flowchart showing a sequence of operations performed during data write, according to another example of the presently disclosed subject matter. FIG. 7 is a variation of the flow described above with reference to FIG. 4. For brevity and simplicity, description of some operations which are provided above with reference to FIG. 4 are not repeated in full detail. Operations in FIG. 7 which have equivalents in FIG. 4 have been given the same reference numerals. According to some examples, in any one of FIGS. 7 to 9 herein below, operations described as being executed by a BE server can be performed for example by deduplication manager 210 and operations described as being executed by DDB can be performed for example by DB deduplication manager 230.

The flow starts with receipt of a first write request at a certain BE server (BE server A) in storage system 100. The write request includes a first write data that is associated with a first logical address e.g. LU, LBA. Operations described above with reference to blocks 401 to 407 are substantially the same and therefore are not described further.

As mentioned above, at block 409, it is determined whether the DDB already includes a deduplication database entry (DDE) which is associated with the first hash value calculated for the first write data.

If there is already a DDE in the DDB with a hash value that is equal to H1, it is further determined whether the corresponding entry comprises a value which equals to H2. According to some examples, if a DDE with a key and the corresponding value that match H1 and H2 respectively is identified, the query can return a virtual address reference key (including a logical address and a deduplication ID) of a virtual address entry which is associated with the identified DDE. As explained above, the uniqueness of hash values in the DDB is such that for a given strong hash value H divided into H1 and H2, it is most unlikely that there is another DDE whose key is equals H1 and whose value contains H2.

If there is no such DDE in the DDB, a response that indicates that the entry does not exist in the DDB is returned and the following is executed, as previously described with reference to FIG. 4:

A new DDE for the first hash value H is added to the DDB (block 411). A reference counter of the new DDE is set to indicate that there is one logical address which is associated with the new entry e.g. reference counter=1 (block 413). A first virtual address entry for the first write data is added to the virtual address database 40, which is associated with BE server A (block 415). At block 417 a validity indicator of the first virtual address entry is set to true.

Different than the examples described above with reference to FIG. 4, here two additional parameters are stored at BE server A. According to this example, the first virtual address entry comprises another counter (named by way of example "DDB reference" counter) storing the value of the reference counter of the respective DDE i.e. the DDE which comprises the hash value of the write data referenced by the first virtual address entry. The value of the DDB reference counter is the last value of the reference counter of the new DDE that has been available to the BE server A, which has been recorded at the last time BE server A was updated with this information. This could have happened for example at the last time of communication between BE server A and DDB, e.g. at the time of issuance of the last decrement request. This counter provides an indication of the lower bound of the number of different logical addresses, which are currently using the respective DE; or in other words the least number of different logical addresses which are currently associated with a virtual address entry referencing the write data stored by the first virtual entry at BE server A. At block 701 DDB reference counter is set to equal 1.

The first virtual address entry further comprises another counter (named by way of example "num decrements" counter) indicating the number of decrement requests that were received at BE server A from other BE servers. At block 703 num decrements counter is set to equal 0.

Figure 7A:
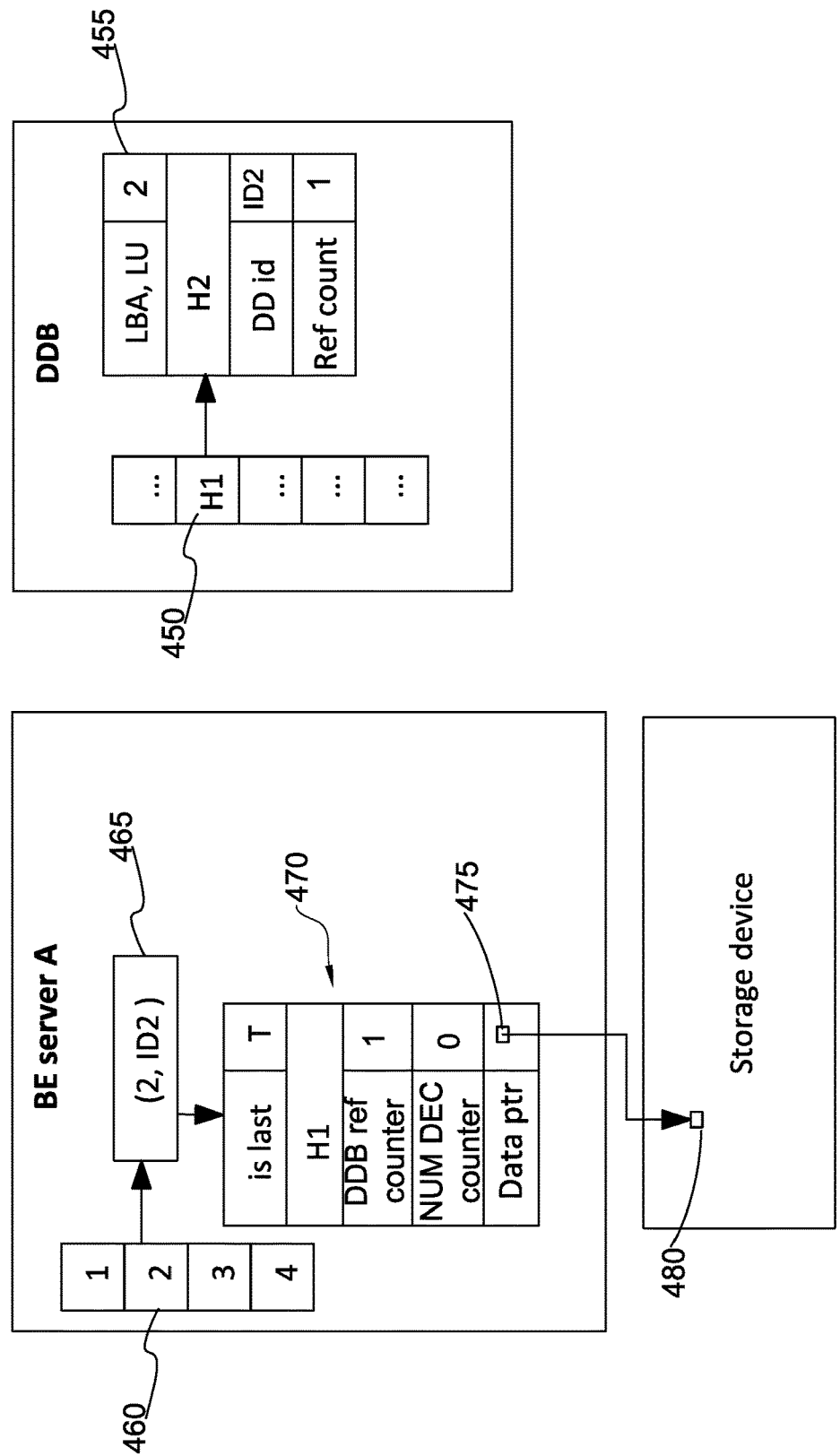
FIG. 7a is a schematic illustration showing by way of example a possible state of virtual address database and of deduplication database following the processing as described with reference to blocks 401 to 410 and 411 to 703 of FIG. 4.

FIG. 7a is a schematic illustration showing by way of example a possible state of virtual address database and of deduplication database following the processing as described with reference to blocks 401 to 410 and 411 to 703 of FIG. 4. It is similar to what is illustrated with respect to FIG. 4a with the addition two counters in virtual address entry 470.

According to some examples, different than what was described earlier with reference to FIG. 5 block 505, when a BE server receives a new write request with new write data, and it no longer needs to point to a virtual address associated with some other BE server referencing a previous version of the write data, it sends that other BE server a message notifying the deletion of the pointer (rather than a decrement request sent to the DDB). Responsive to this message, the other BE server (e.g. BE server B) sends a decrement request to DDB. For this reason, according to this example a virtual address entry which points to virtual address entry at another BE server is not required to store H1 as the relevant H1 is stored at the other BE server which sends the message to DDB. This contributes to reduction of the storage space consumed by the virtual address database 40.

Furthermore, according to the alternative approach disclosed with reference to FIG. 7, a decrement request is not sent responsive to each pointer deletion, but only after a certain number of decrement messages are received. Once a sufficient number of decrement messages are accumulated at the BE server (the one which actually points to the data in the physical storage space; here BE server B), the BE server sends an incremental decrement request to the DDB. This helps to reduce traffic and access time used for decrement operations. As explained below with reference to FIGS. 8 and 9, according to some examples, a sufficient number of decrement messages, which merit sending a decrement request to DDB, is determined based on the value of the "num decrements" counter and the "DDB reference" counter.

Reverting back to block 409, in the event that it is determined that there is an existing entry in the DDB 330 for H1 and H2 of the first hash value H, the operations described above with reference to blocks 419 to 425 are executed. The operations related to block 723 in FIG. 7 differ from its counterparts of 423 FIG. 4 in that H1 value is not stored in the new virtual address entry.

Figure 7B:
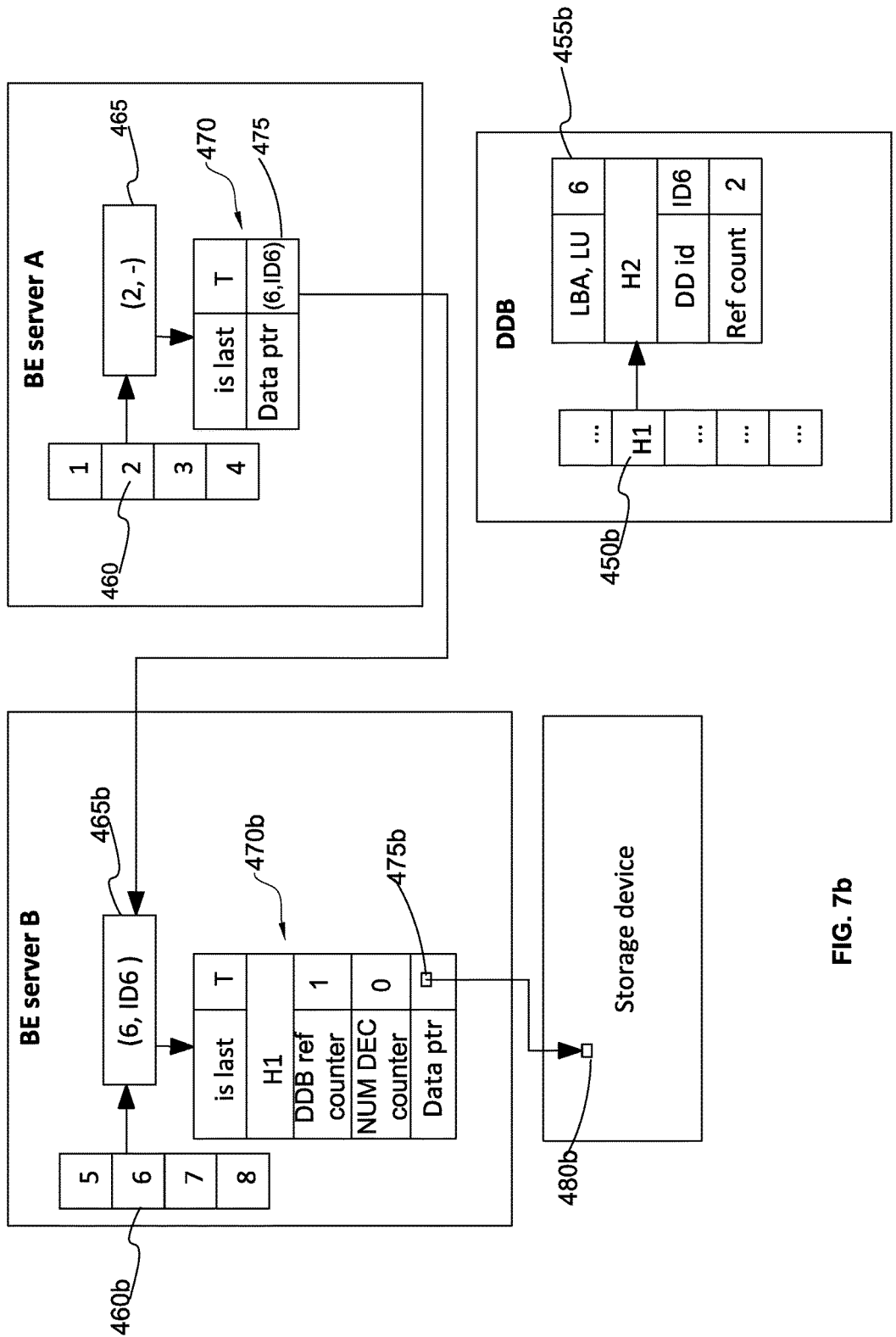
FIG. 7b is a schematic illustration showing by way of example a possible state of virtual address database and of deduplication database following the processing as described with reference to blocks 401 to 410 and 419 to 425 of FIG. 7.

FIG. 7b is a schematic illustration showing by way of example a possible state of virtual address database and of deduplication database following the processing as described with reference to blocks 401 to 410 and 419 to 425 of FIG. 7. FIG. 7b is similar to FIG. 4b with the difference of the additional 2 counters and the missing H1 value from virtual address entry 470.

Figure 8:
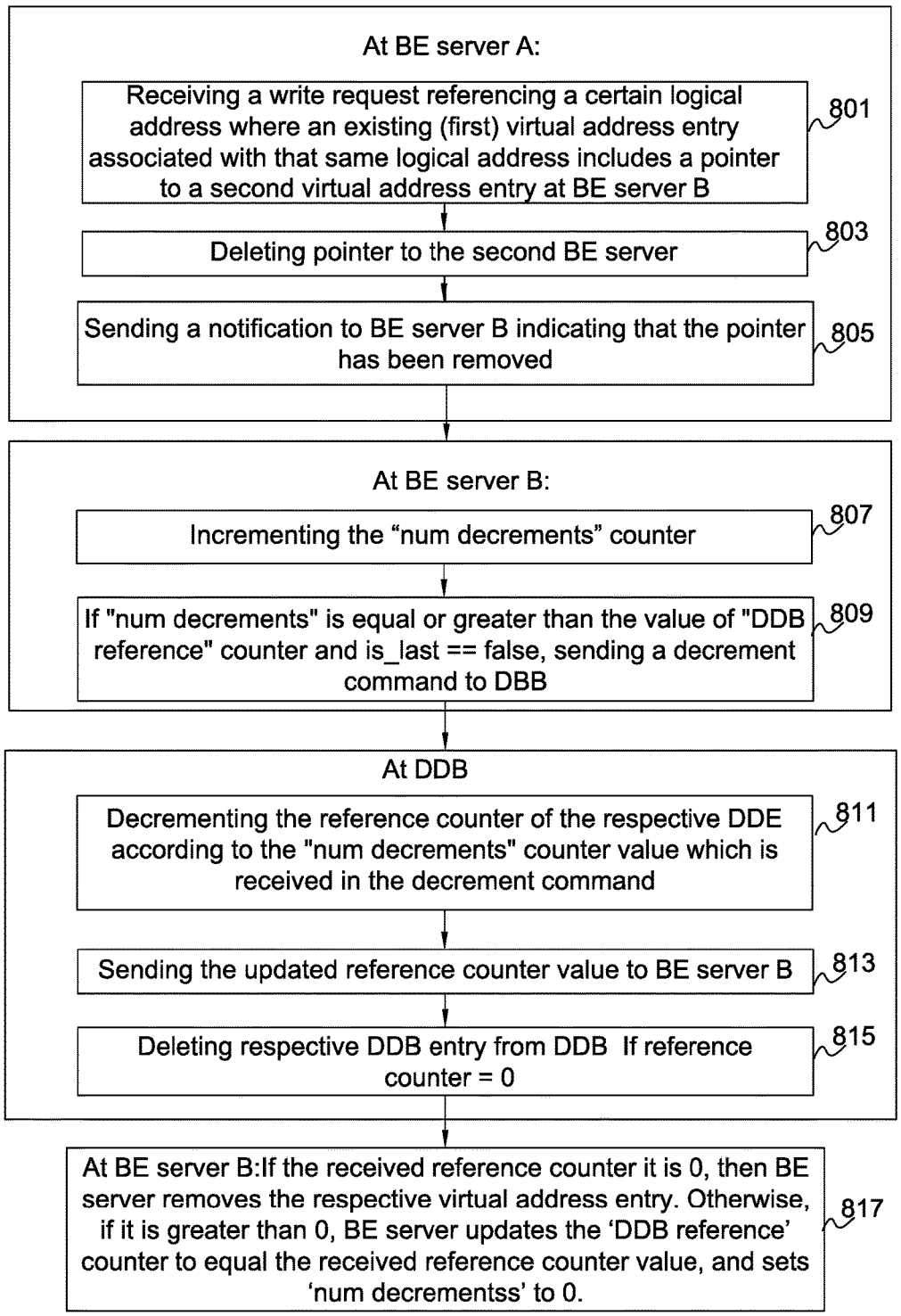
FIG. 8 is a flowchart illustration of operations carried out during data write according to examples of the presently disclosed subject matter.

Referring now to FIG. 8 which is a flowchart of operations carried out according to some examples of the presently disclosed subject matter, FIG. 8 exemplifies operations which are executed in the event that a second write request is received at a BE server (BE server A), where the second write request references a logical address and where responsive to a previous (first) write request addressing that same logical address, a virtual address entry was added, the virtual address entry comprises a pointer pointing to another virtual address entry stored at another BE server (BE server B). A procedure leading to such a state was described above with reference to FIG. 7 blocks 401 to 410 and 419 to 425. BE server A in FIG. 7b shows a schematic illustration of this scenario.

For brevity and simplicity of the description operations related to the assignment of a write request to the relevant BE server, which are described above with reference to block 401 are not repeated in the following parts.

At block 801, a second write request is received at BE server A, the second write request addressing a logical address that is associated with a first virtual address entry comprising a pointer pointing to a second virtual address entry which is associated with a different BE server (BE server B). The second virtual address entry is pointing to the location at the physical storage space where a copy of the first write data is stored.

Notably, the BE server which is responsible for the address in the second write request can determine (for example by I/O manager 210) that the address is already associated with an existing virtual address entry in the virtual address database.

At block 803 the pointer from the virtual address entry at BE server A to the second virtual address entry at BE server B, is deleted. At block 805 a message, indicating that the pointer has been deleted, is sent from BE server A to BE server B.

Responsive to the message, BE server B increments the "num decrements" counter (block 807). According to some examples, If "num decrements" is equal or greater than the value of "DDB reference" counter, and the respective validity indicator of the virtual address entry is not marked as 'true', then a decrement request is sent from BE server B to DDB (block 809). Notably, if the validity indicator is 'true' this indicates that there is still at least one virtual address entry which uses the DDE, and accordingly it can be inferred that the reference counter of the DDE does not equal zero.

As explained above, the decrement request includes the logical address of the first write data, the first deduplication identifier assigned to the write data and H1. Responsive to the request, DDB finds the respective entry and decrements the reference counter (block 811). DDB decrements the reference counter of the respective DDE according to the "num decrements" value received in the decrement request. DDB sends a response to BE server B with the updated reference counter value (block 813). If the reference counter at the DDE indicates that no other BE server is associated with the entry (e.g. the reference counter equals 0), DDB deletes the DDE (block 815).

At block 817 the BE server (BE server B) receives the response with the updated reference counter value. If the value equals 0, then BE server B deletes the respective virtual address entry. Otherwise, if it is greater than 0, BE server B updates the 'DDB reference' counter to equal the received reference counter value, and sets 'num decrements' to 0.

In addition, the operations described above with reference to blocks 403-425 are repeated in order to write the new write data of the second write request. This includes determining whether or not the write of the second write request is already with a respective entry in DDB and proceeding with updating the DDB and the deduplication database accordingly.

Figure 9:
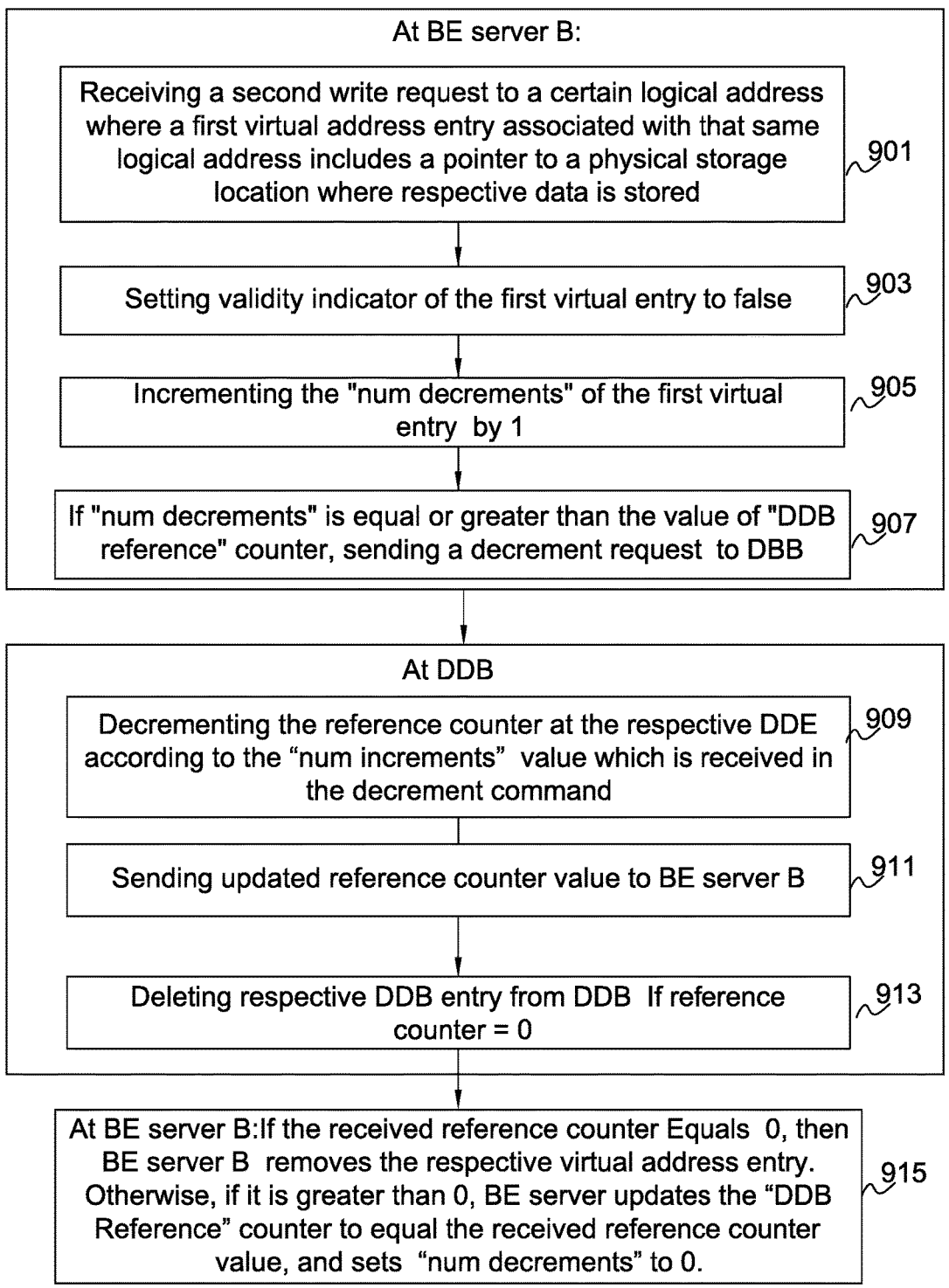
FIG. 9 is a flowchart illustration of operations carried out during data write according to examples of the presently disclosed subject matter.

Referring now to FIG. 9 which is a flowchart of operations carried out according to some examples of the presently disclosed subject matter, FIG. 9 exemplifies operations which are executed in the event that a second write request is received at a BE server, where the second write request references a second logical address, and the BE server holds a virtual address entry added responsive to a previous write request addressing that same logical address. BE server B in FIG. 7b presents a schematic illustration of this scenario.

For brevity and simplicity of the description, operations related to the assignment of a write request to the relevant BE server, which are described above with reference to block 401 are not repeated in the following parts.

At block 901, a second write request is received at a BE server (BE server B), the second write request addressing a logical address (LU, LBA) that is associated with a first virtual address entry. The first virtual address entry has been created responsive to a previous (first) write request addressing the same logical address as the second write request. The first virtual address entry comprises a pointer pointing to a location at the physical storage space where the write data received in the earlier write request is stored. BE server B in FIG. 4b presents a schematic illustration of this scenario.

Notably, the BE server which is responsible for the address in the second write request can determine (performed for example by I/O manager 210) that the address is already associated with an existing virtual address entry in the virtual address database.

At block 903 a validity indicator ("is_last") of the first virtual address entry is changed to 'false'. As new data has now been received, a read request should be directed to read the new data, and not the older data referenced by the first virtual address entry.

At block 905 the "num decrements" counter is incremented by 1. According to some examples, if "num decrements" is equal or greater than the value of "DDB reference" counter, then a decrement request is sent to DDB (block 907). The decrement request includes the "num decrements" indicating the decrement value. The decrement request can also include: H1, the logical block address (indicated by '6' in FIG. 4b) and the deduplication identifier (indicated by 'ID6' in FIG. 4b). Notably, according to the example illustrated in FIG. 9 the validity indicator is always false.

Responsive to the request, DDB finds the respective DDE and decrements the respective reference counter according to the "num increments" value which is received in the decrement request (block 909). DDB then sends a response to BE server B with the updated reference counter (block 911). If the reference counter of the DDE indicates that no other logical address is associated with the entry (e.g. the reference counter equals 0), DDB deletes the entry from the DDB (block 913). Operations described with reference to block 909 to 913 can be performed for example by deduplication manager 230.

At block 915, BE server B receives the response with the updated reference counter value. If it is 0, then BE server removes the respective virtual address entry. Otherwise, if it is greater than 0, BE server updates the 'DDB reference counter' to equal the received reference counter value, and sets 'num decrements' to 0.

In addition, the operations described above with reference to blocks 403-425 are repeated in order to write the new write data of the second write request. This includes determining whether or not the write of the second write request is already with a respective entry in DDB and proceeding with updating the DDB and the deduplication database accordingly.

Figure 10:
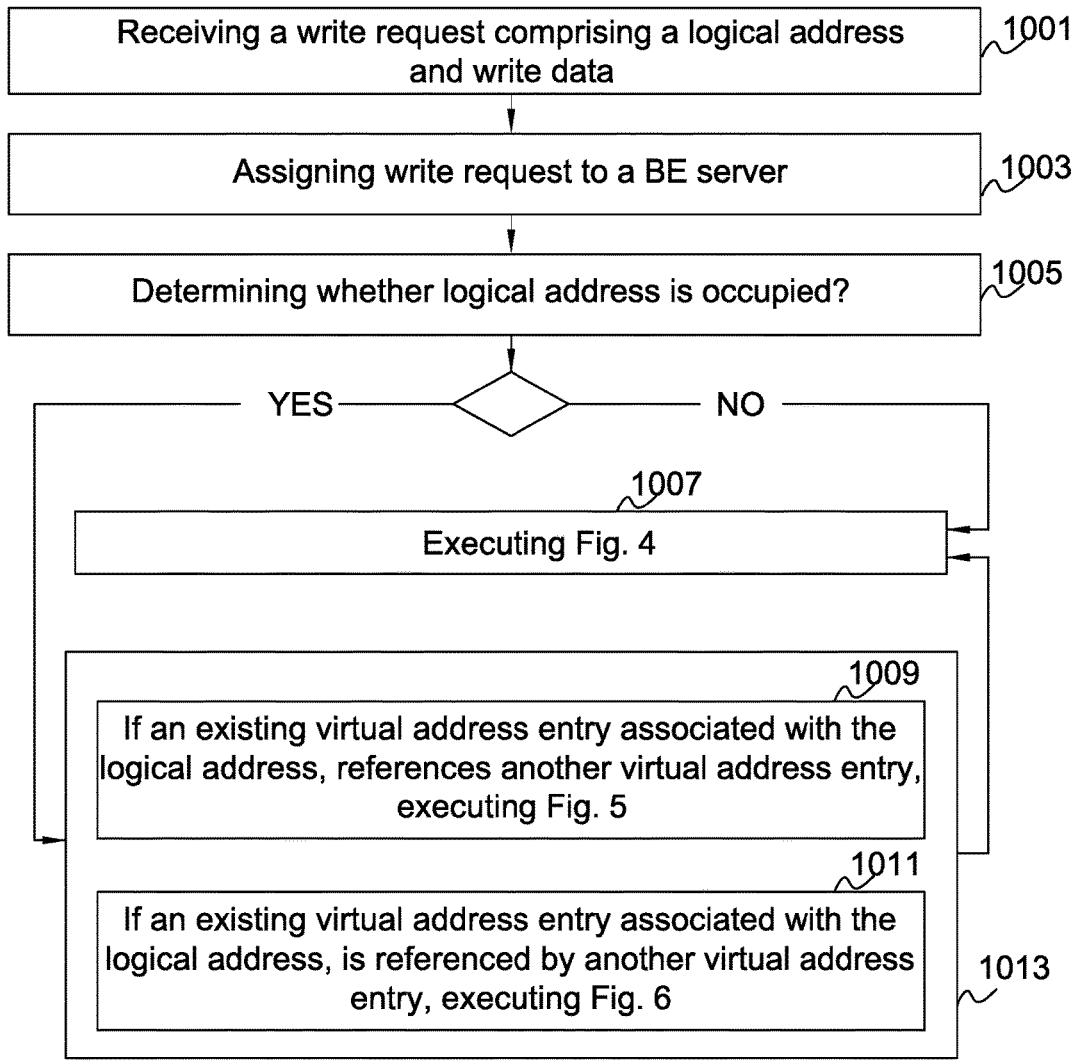
FIG. 10 is a flowchart illustration of high-level operations carried out during data write according examples of the presently disclosed subject matter.

FIG. 10 is a flowchart illustration of high-level operations carried out during data write according to examples of the presently disclosed subject matter. Once a write request is received at the appropriate BE server 320 the request is processed to determine which of the procedures described above with reference to FIGS. 4 to 6 (or FIGS. 7 to 9) should be executed.

At block 1005 it is determined whether the write request is a re-write request; or in other words whether viable data is currently written to the logical address referenced in the write request. If not, operations are executed according to FIG. 4 (block 1007).

If yes, it is further determined whether:
a) an existing virtual address entry associated with the logical address, references another virtual address entry, and if it is, operations are executed according to FIG. 5 (block 1009); OR whether b) an existing virtual address entry associated with the logical address, is referenced by another virtual address entry, and if it is, operations are executed according to FIG. 6 (block 1011).

Following block 1013, operations are executed according to FIG. 4.

The same principles apply to implementation of deduplication according to FIGS. 7, 8 and 9, mutatis mutandis.

It should be noted that while the examples herein address situations where existing copies of write data are stored in association with virtual address entries at a BE server different than the one receiving the current write request, in some examples an existing copy of write data can be stored in association with a virtual address entry at the same BE server as the one receiving the current write request. In such cases, similar principles as those disclosed above can be applied.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer-readable non-transitory memory tangibly embodying a program of instructions executable by the computer for performing the method of the presently disclosed subject matter. The term "non-transitory" is used herein to exclude transitory, propagating signals, but to otherwise include any volatile or non-volatile computer memory technology suitable to the application.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. In a storage-system comprising a plurality of computer devices, each computer device is assigned with access to a respective storage area in the storage-system and is responsive for handling write requests addressed to the respective storage area, a method comprising:
at a first computer device from the plurality of computer devices:
receiving a first write request including a first write data addressing a first logical block address;
computing a first hash value based on the first write data;
dividing the first hash value into a first hash value part (H1), and a second hash value part (H2);
assigning a first deduplication ID for the first write data, wherein deduplication IDs are assigned such that they are unique within the address space of the first logical block address;
providing a first virtual address reference key for the first write data, comprising; the first logical block address and the first deduplication ID;
querying a deduplication database (DDB) to determine whether H1 and H2 are already associated with an existing deduplication database entry (DDE) referencing an existing virtual address entry associated with a second logical block address assigned to a second computer device from the plurality of computer devices, and if yes:

providing a first virtual address entry, comprising:

the first virtual address reference key and a first pointer pointing to the existing virtual address entry, the existing virtual address entry comprises a second pointer, pointing to a storage location, assigned to the second computer device, where the write data is stored; and storing the first virtual address entry in a storage location assigned to the first computer device wherein if H1 or H2 are not already associated with an existing DDE:

creating a new DDE to be stored at the DDB for the first write data, the new DDE comprising:

H1 referencing respective data comprising:

H2, the first logical block address; the first deduplication ID; and a reference counter which is set to indicate that there is one virtual address entry associated with the new DDE; and creating a first virtual address entry comprising the first virtual address reference key and a first pointer pointing to a storage location, assigned to the first computer device, where the write data is stored; and storing the first virtual address entry in the storage area assigned to the first computer device.

2. The method according to claim 1, wherein the first virtual address entry further comprises a validity indicator indicating that a read request addressing the first logical block address is to be directed to read data associated with the first virtual address entry.

3. The method according to claim 2 further comprising incrementing a reference counter of the existing DDE by 1.

4. The method according to claim 1 wherein the providing of the first virtual address entry further comprises:

providing a validity indicator set to indicate that a read request addressing the first logical block address should be directed to read data associated with the first virtual address entry.

5. The method according to claim 1 further comprising setting a reference counter of the new DDE to indicate that one virtual address entry is referenced by the new DE.

6. The method according to claim 1 further comprising:

wherein, at the first computer device, the method further comprises:

setting a 'deduplication database reference' counter stored at the first virtual address entry to equal 1; the deduplication database reference counter is indicative of a last available value of the reference counter of the new DE; and setting a 'num decrements' counter stored at the first virtual address entry to equal zero; the num decrements counter is indicative of a number of decrement notification messages received at the first computer device indicating that a pointer referencing the first virtual address entry has been deleted.

7. In a storage-system comprising a plurality of computer devices, each computer device is assigned with access to a respective storage area in the storage-system and is responsive for handling write requests addressed to the respective storage area, a method comprising:

at a first computer device from the plurality of computer devices:

receiving a first write request including a first write data addressing a first logical block address;

computing a first hash value based on the first write data;

dividing the first hash value into a first hash value part (H1), and a second hash value part (H2);

assigning a first deduplication ID for the first write data, wherein deduplication IDs are assigned such that they are unique within the address space of the first logical block address;

providing a first virtual address reference key for the first write data, comprising; the first logical block address and the first deduplication ID;

querying a deduplication database (DDB) to determine whether H1 and H2 are already associated with an existing deduplication database entry (DDE) referencing an existing virtual address entry associated with a second logical block address assigned to a second computer device from the plurality of computer devices, and if yes:

providing a first virtual address entry, comprising:

the first virtual address reference key and a first pointer pointing to the existing virtual address entry, the existing virtual address entry comprises a second pointer, pointing to a storage location, assigned to the second computer device, where the write data is stored, wherein the first virtual address entry further comprises a validity indicator indicating that a read request addressing the first logical block address is to be directed to read data associated with the virtual address entry; and storing the first virtual address entry in a storage location assigned to the first computer device;

incrementing a reference counter of the existing DDE by 1;

wherein at the time of receiving the first write request, a first existing virtual address entry is already associated with the first logical block address assigned to the first computer device; the first existing virtual address entry comprises a pointer pointing to another existing virtual address entry associated with a logical block address assigned to a different computer device; the method further comprising:

deleting the pointer pointing to the existing virtual address entry; and sending a decrement request to the DDB requesting to decrement the reference counter of a DDE referencing the other virtual address entry.

8. The method according to claim 7 further comprising:

at the DDB:

responsive to the decrement request, decrementing the reference counter of the DDE referencing the other virtual address entry, by 1;

deleting the DDE referencing the other virtual address entry, if the reference counter of the DDE referencing the other virtual address entry, indicates that no virtual address entry is referenced by it; and sending a notification to the different computer device that the DDE has been deleted.

9. The method according to claim 8 further comprising:

at the different computer device, deleting the other virtual address entry.

10. In a storage-system comprising a plurality of computer devices, each computer device is assigned with access to a respective storage area in the storage-system and is responsive for handling write requests addressed to the respective storage area, a method comprising:

at a first computer device from the plurality of computer devices:

receiving a first write request including a first write data addressing a first logical block address;

computing a first hash value based on the first write data;
dividing the first hash value into a first hash value part (H1), and a second hash value part (H2);
assigning a first deduplication ID for the first write data, wherein deduplication IDs are assigned such that they are unique within the address space of the first logical block address;
providing a first virtual address reference key for the first write data, comprising; the first logical block address and the first deduplication ID;
querying a deduplication database (DDB) to determine whether H1 and H2 are already associated with an existing deduplication database entry (DDE) referencing an existing virtual address entry associated with a second logical block address assigned to a second computer device from the plurality of computer devices, and if yes:
providing a first virtual address entry, comprising:
the first virtual address reference key and a first pointer pointing to the existing virtual address entry, the existing virtual address entry comprises a second pointer, pointing to a storage location, assigned to the second computer device, where the write data is stored, wherein the first virtual address entry further comprises a validity indicator indicating that a read request addressing the first logical block address is to be directed to read data associated with the virtual address entry; and
storing the first virtual address entry in a storage location assigned to the first computer device;
incrementing a reference counter of the existing DDE by 1;
wherein at the time of receiving the first write request, a first existing virtual address entry is already associated with the first logical block address assigned to the first computer device and a second existing virtual address entry associated with another logical block address comprises a pointer pointing to the first existing virtual address entry and a validity indicator of the first existing virtual address entry indicates that a read request addressing the first logical block address should be directed to read data associated with the first existing virtual address entry; the method further comprising:
updating a validity indicator of the first existing virtual address entry to indicate that a read request addressing the first logical block address should not be directed to read data associated with the first existing virtual address entry; and
sending a decrement request to the DDB requesting to decrement a reference counter of a DDE referencing the first existing virtual address entry.

11. The method according to claim 10 further comprising:
at the DDB, responsive to the decrement request, decrementing the reference counter of the DDE referencing the first existing virtual address entry.

12. The method according to claim 10 further comprising:
at the DDB:
responsive to the decrement request, decrementing the reference counter at the DDE referencing the first existing virtual address entry by the DDB decrement value; and deleting the DDE referencing the first existing virtual address entry if the reference counter indicates that number of virtual addresses entries that are associated with the DDE is zero.

13. In a storage-system comprising a plurality of computer devices, each computer device is assigned with access to a respective storage area in the storage-system and is responsive for handling write requests addressed to the respective storage area, a method comprising:
at a first computer device from the plurality of computer devices:
receiving a first write request including a first write data addressing a first logical block address;
computing a first hash value based on the first write data;
dividing the first hash value into a first hash value part (H1), and a second hash value part (H2);
assigning a first deduplication ID for the first write data, wherein deduplication IDs are assigned such that they are unique within the address space of the first logical block address;
providing a first virtual address reference key for the first write data, comprising; the first logical block address and the first deduplication ID;
querying a deduplication database (DDB) to determine whether H1 and H2 are already associated with an existing deduplication database entry (DDE) referencing an existing virtual address entry associated with a second logical block address assigned to a second computer device from the plurality of computer devices, and if yes:
providing a first virtual address entry, comprising:
the first virtual address reference key and a first pointer pointing to the existing virtual address entry, the existing virtual address entry comprises a second pointer, pointing to a storage location, assigned to the second computer device, where the write data is stored, wherein the first virtual address entry further comprises a validity indicator indicating that a read request addressing the first logical block address is to be directed to read data associated with the virtual address entry; and
storing the first virtual address entry in a storage location assigned to the first computer device;
incrementing a reference counter of the existing DDE by 1;
wherein at the time of receiving the first write request, a first existing virtual address entry is already associated with the first logical block address assigned to the first computer device; the first existing virtual address entry comprises a pointer pointing to another virtual address entry associated with a logical block address assigned to a different computer device; the method further comprising:
deleting the pointer pointing to the other virtual address entry; and
notifying the different computer device indicating that the pointer has been deleted;
wherein, at the different computer device, the method further comprises:
incrementing a num_decrements counter of the other virtual address entry by 1;
if the num_decrements counter of the other virtual address entry is equal or greater than a deduplication database reference counter of the other virtual address entry and a validity indicator of the other virtual address entry is false, sending a decrement request to the DDB requesting to decrement the reference counter of the DDE referencing the other virtual address entry by a value which equals the num decrements counter;
receiving an updated reference counter value, after completion of the decrement request at the DDB;
if the updated reference counter value equals zero, deleting the other virtual address entry; and if the updated reference counter value is greater than zero, updating the deduplication database reference counter to equal the received reference counter value; and setting the respective num decrements value to equal 0.

14. The method according to claim 13 further comprising, at the DDB, deleting the DDE referencing the other virtual address entry, if the reference counter of the DDE referencing the other virtual address entry, indicates that no virtual address entry is referenced by it.

15. In a storage-system comprising a plurality of computer devices, each computer device is assigned with access to a respective storage area in the storage-system and is responsive for handling write requests addressed to the respective storage area, a method comprising:
- at a first computer device from the plurality of computer devices:
- receiving a first write request including a first write data addressing a first logical block address:
- computing a first hash value based on the first write data;
- dividing the first hash value into a first hash value part (H1), and a second hash value part (H2);
- assigning a first deduplication ID for the first write data, wherein deduplication IDs are assigned such that they are unique within the address space of the first logical block address;
- providing a first virtual address reference key for the first write data, comprising; the first logical block address and the first deduplication ID;
- querying a deduplication database (DDB) to determine whether H1 and H2 are already associated with an existing deduplication database entry (DDE) referencing an existing virtual address entry associated with a second logical block address assigned to a second computer device from the plurality of computer devices, and if yes:
- providing a first virtual address entry, comprising:
- the first virtual address reference key and a first pointer pointing to the existing virtual address entry, the existing virtual address entry comprises a second pointer, pointing to a storage location, assigned to the second computer device, where the write data is stored; and
- storing the first virtual address entry in a storage location assigned to the first computer device;
- incrementing a reference counter of the existing DDE by 1;
- wherein at the time of receiving the first write request, a first existing virtual address entry is already associated with the first logical block address assigned to the first computer device and a second existing virtual address entry stored at another computer device comprises a pointer pointing to the first existing virtual address entry; the method further comprising:
- updating a validity indicator of the first existing virtual address entry to indicate that a read request addressing the first logical block address should not be directed to read data associated with the first existing virtual address entry;
- incrementing a num_decrements counter of the first existing virtual address entry by 1;
- if a num_decrements counter of the first existing virtual address entry is equal or greater than a DDB reference counter of the first existing virtual address entry, sending a decrement request to the DDB requesting to decrement the reference counter at the DDE referencing the second existing virtual address entry by a value which equals the num_decrements counter;
- receiving an updated reference counter value, after completion of the decrement request at the DDB; and
- if the updated reference counter value equals zero, deleting the first existing virtual address entry;
- if the updated reference counter value is greater than zero:
- updating the respective DDB reference counter to equal the received reference counter value; and setting the respective num decrements value to equal 0.

16. A distributed data-storage system comprising a plurality of computer devices operatively connected to one or more storage devices constituting a physical storage space of the data-storage system; wherein each computer device of the plurality of computer devices is assigned with access to a respective logical block address area having a corresponding physical storage area in the physical storage space, and is responsive for handling I/O requests addressed to the respective logical block address area; a first computer device from among the plurality of computer devices is configured to:
- receive a first write request including a first write data addressing a first logical block address; compute a first hash value based on the first write data; divide the first hash value into a first hash value part (H1), and a second hash value part (H2); assign a first deduplication ID for the first write data, wherein deduplication IDs are assigned such that they are unique within the address space of the first logical block address; provide a first virtual address reference key for the first write data, comprising the first logical block address and the first deduplication ID;
- query a deduplication database (DDB) to determine whether H1 and H2 are already associated with an existing deduplication database entry (DDE) referencing a first existing virtual address entry associated with a second logical block address assigned to a second computer devices from the plurality of computer devices, and if yes:
- create a first virtual address entry, comprising: the first virtual address reference key and a first pointer pointing to the first existing virtual address entry, the first existing virtual address entry comprises a second pointer, pointing to a storage location, assigned to the second computer device, where the write data is stored; and
- store the first virtual address entry in a storage location assigned to the first computer device;
- wherein if H1 or H2 are not already associated with an existing DDE and wherein the DDB is configured to create a new DDE for the first write data, the new DDE comprising: H1 referencing respective data comprising: H2, the first logical block address; the first deduplication ID; and a reference counter which is set to indicate that there is one virtual address entry associated with the new DDE; and
- wherein the first computer device is configured to:
- create a first virtual address entry comprising the first virtual address reference key and a first pointer pointing to a storage location, assigned to the first computer device, where the write data is stored; and store the first virtual address entry in the storage area assigned to the first computer device.

17. The system according to claim 16, wherein the first computer device is further configured for providing the first virtual address entry to provide a validity indicator set to indicate that a read request addressing the first logical block address should be directed to read data associated with the first virtual address entry.

18. The system according to claim 16, wherein the DDB is configured to set a reference counter of the new DDE to indicate that one virtual address entry is referenced by the new DE.

19. The system according to claim 16, wherein the first computer device is further configured to:
- set a 'deduplication database reference' counter stored at the first virtual address entry to equal 1; the deduplication database reference counter is indicative of a last available value of the reference counter of the new DE;
- set a 'num decrements' counter stored at the first virtual address entry to equal zero; the num decrements counter is indicative of a number of decrement notification messages received at the first computer device indicating that a pointer referencing the first virtual address entry has been deleted.

20. A distributed data-storage system comprising a plurality of computer devices operatively connected to one or more storage devices constituting a physical storage space of the data-storage system; wherein each computer device of the plurality of computer devices is assigned with access to a respective logical block address area having a corresponding physical storage area in the physical storage space, and is responsive for handling I/O requests addressed to the respective logical block address area; a first computer device from among the plurality of computer devices is configured to:
- receive a first write request including a first write data addressing a first logical block address; compute a first hash value based on the first write data; divide the first hash value into a first hash value part (H1), and a second hash value part (H2); assign a first deduplication ID for the first write data, wherein deduplication IDs are assigned such that they are unique within the address space of the first logical block address; provide a first virtual address reference key for the first write data, comprising the first logical block address and the first deduplication ID;
- query a deduplication database (DDB) to determine whether H1 and H2 are already associated with an existing deduplication database entry (DDE) referencing a first existing virtual address entry associated with a second logical block address assigned to a second computer devices from the plurality of computer devices, and if yes:
- create a first virtual address entry, comprising: the first virtual address reference key and a first pointer pointing to the first existing virtual address entry, the first existing virtual address entry comprises a second pointer, pointing to a storage location, assigned to the second computer device, where the write data is stored; and
- store the first virtual address entry in a storage location assigned to the first computer device;
- wherein the first virtual address entry further comprises a validity indicator indicating that a read request addressing the first logical block address should be directed to read data associated with the first virtual address entry;
- wherein the DDB is configured to increment a reference counter of the existing DDE by 1; and
- wherein at the time of receiving the first write request, a first existing virtual address entry is already associated with the first logical block address assigned to the first computer device; the first existing virtual address entry comprises a pointer pointing to another existing virtual address entry associated with a logical block address assigned to a different computer device; wherein the first computer device is further configured to:
- delete the pointer pointing to the existing virtual address entry; and send a decrement request to the DDB requesting to decrement the reference counter of a DDE referencing the other virtual address entry.

21. The system according to claim 20, wherein the DDB is configured responsive to the decrement request, to:
- decrement the reference counter of the DDE referencing the other virtual address entry, by 1; delete the DDE referencing the other virtual address entry, if the reference counter of the DDE referencing the other virtual address entry, indicates that no virtual address entry is referenced by it; and send a notification to the different computer device indicating that the DDE has been deleted.

22. The system according to claim 21 wherein the different computer device is configured, responsive to receiving the notification from the DDB to delete the other virtual address entry.

23. A distributed data-storage system comprising a plurality of computer devices operatively connected to one or more storage devices constituting a physical storage space of the data-storage system; wherein each computer device of the plurality of computer devices is assigned with access to a respective logical block address area having a corresponding physical storage area in the physical storage space, and is responsive for handling I/O requests addressed to the respective logical block address area; a first computer device from among the plurality of computer devices is configured to:
- receive a first write request including a first write data addressing a first logical block address; compute a first hash value based on the first write data; divide the first hash value into a first hash value part (H1), and a second hash value part (H2); assign a first deduplication ID for the first write data, wherein deduplication IDs are assigned such that they are unique within the address space of the first logical block address; provide a first virtual address reference key for the first write data, comprising the first logical block address and the first deduplication ID;
- query a deduplication database (DDB) to determine whether H1 and H2 are already associated with an existing deduplication database entry (DDE) referencing a first existing virtual address entry associated with a second logical block address assigned to a second computer devices from the plurality of computer devices, and if yes:
- create a first virtual address entry, comprising: the first virtual address reference key and a first pointer pointing to the first existing virtual address entry, the first existing virtual address entry comprises a second pointer, pointing to a storage location, assigned to the second computer device, where the write data is stored; and
- store the first virtual address entry in a storage location assigned to the first computer device;
- wherein the first virtual address entry further comprises a validity indicator indicating that a read request addressing the first logical block address should be directed to read data associated with the first virtual address entry;
- wherein the DDB is configured to increment a reference counter of the existing DDE by 1; and
- wherein at the time of receiving the first write request, a first existing virtual address entry is already associated with the first logical block address assigned to the first computer device and a second existing virtual address entry associated with another logical block address comprises a pointer pointing to the first existing virtual address entry and a validity indicator of the first existing virtual address entry indicates that a read request addressing the first logical block address should be directed to read data associated with the first existing virtual address entry; the first computer device is configured to:
update a validity indicator of the first existing virtual address entry to indicate that a read request addressing the first logical block address should not be directed to read data associated with the first existing virtual address entry; and send a decrement request to the DDB requesting to decrement a reference counter of a DDE referencing the first existing virtual address entry.

24. The system according to claim 23, wherein the DDB is configured, responsive to the decrement request, to decrement the reference counter of the DDE referencing the first existing virtual address entry.

25. A distributed data-storage system comprising a plurality of computer devices operatively connected to one or more storage devices constituting a physical storage space of the data-storage system; wherein each computer device of the plurality of computer devices is assigned with access to a respective logical block address area having a corresponding physical storage area in the physical storage space, and is responsive for handling I/O requests addressed to the respective logical block address area; a first computer device from among the plurality of computer devices is configured to:
receive a first write request including a first write data addressing a first logical block address; compute a first hash value based on the first write data; divide the first hash value into a first hash value part (H1), and a second hash value part (H2); assign a first deduplication ID for the first write data, wherein deduplication IDs are assigned such that they are unique within the address space of the first logical block address; provide a first virtual address reference key for the first write data, comprising the first logical block address and the first deduplication ID;
query a deduplication database (DDB) to determine whether H1 and H2 are already associated with an existing deduplication database entry (DDE) referencing a first existing virtual address entry associated with a second logical block address assigned to a second computer devices from the plurality of computer devices, and if yes:
create a first virtual address entry, comprising: the first virtual address reference key and a first pointer pointing to the first existing virtual address entry, the first existing virtual address entry comprises a second pointer, pointing to a storage location, assigned to the second computer device, where the write data is stored; and
store the first virtual address entry in a storage location assigned to the first computer device;
wherein the first virtual address entry further comprises a validity indicator indicating that a read request addressing the first logical block address should be directed to read data associated with the first virtual address entry;
wherein the DDB is configured to increment a reference counter of the existing DDE by 1;
wherein at the time of receiving the first write request, a first existing virtual address entry is already associated with the first logical block address assigned to the first computer device; the first existing virtual address entry comprises a pointer pointing to another virtual address entry associated with a logical block address assigned to a different computer device; wherein the first computer device is configured to delete the pointer pointing to the other virtual address entry; and send a notification to the different computer device indicating that the pointer has been deleted; and
wherein the different computer device is configured to:
increment a num_decrements counter of the other virtual address entry by 1; send a decrement request to the DDB requesting to decrement the reference counter of the DDE referencing the other virtual address entry by a value which equals the num decrements counter, if the num_decrements counter of the other virtual address entry is equal or greater than a deduplication database reference counter of the other virtual address entry and a validity indicator of the other virtual address entry is false;
receive an updated reference counter value, after completion of the decrement request at the DDB;
delete the other virtual address entry, if the updated reference counter value equals zero;
if the updated reference counter value is greater than zero: update the deduplication database reference counter to equal the received reference counter value; and set the respective num decrements value to equal 0.

26. The system according to claim 25, wherein the DDB is configured to delete the DDE referencing the other virtual address entry, if the reference counter of the DDE referencing the other virtual address entry, indicates that no virtual address entry is referenced by it.

27. The system according to claim 25, wherein the DDB is configured responsive to the decrement request, to decrement the reference counter at the DDE referencing the first existing virtual address entry by the DDB decrement value; and delete the DDE referencing the first existing virtual address entry if the reference counter indicates that number of virtual addresses entries that are associated with the DDE is zero.

28. A distributed data-storage system comprising a plurality of computer devices operatively connected to one or more storage devices constituting a physical storage space of the data-storage system; wherein each computer device of the plurality of computer devices is assigned with access to a respective logical block address area having a corresponding physical storage area in the physical storage space, and is responsive for handling I/O requests addressed to the respective logical block address area; a first computer device from among the plurality of computer devices is configured to:
receive a first write request including a first write data addressing a first logical block address; compute a first hash value based on the first write data; divide the first hash value into a first hash value part (H1), and a second hash value part (H2); assign a first deduplication ID for the first write data, wherein deduplication IDs are assigned such that they are unique within the address space of the first logical block address; provide a first virtual address reference key for the first write data, comprising the first logical block address and the first deduplication ID;
query a deduplication database (DDB) to determine whether H1 and H2 are already associated with an existing deduplication database entry (DDE) referencing a first existing virtual address entry associated with a second logical block address assigned to a second computer devices from the plurality of computer devices, and if yes:

create a first virtual address entry, comprising: the first virtual address reference key and a first pointer pointing to the first existing virtual address entry, the first existing virtual address entry comprises a second pointer, pointing to a storage location, assigned to the second computer device, where the write data is stored; and store the first virtual address entry in a storage location assigned to the first computer device;

wherein the first virtual address entry further comprises a validity indicator indicating that a read request addressing the first logical block address should be directed to read data associated with the first virtual address entry;

wherein the DDB is configured to increment a reference counter of the existing DDE by 1; and wherein at the time of receiving the first write request, a first existing virtual address entry is already associated with the first logical block address assigned to the first computer device and a second existing virtual address entry stored at another computer device comprises a pointer pointing to the first existing virtual address entry and a validity indicator of the first existing virtual address entry indicates that a read request addressing the first logical block address should be directed to read data associated with the first existing virtual address entry; the first computer device is configured to:

update a validity indicator of the first existing virtual address entry to indicate that a read request addressing the first logical block address should not be directed to read data associated with the first existing virtual address entry; increment a num_decrements counter of the first existing virtual address entry by 1;

if a num_decrements counter of the first existing virtual address entry is equal or greater than a DDB reference counter of the first existing virtual address entry, send a decrement request to the DDB requesting to decrement the reference counter at the DDE referencing the second existing virtual address entry by a value which equals the num_decrements counter;

receive an updated reference counter value, after completion of the decrement request at the DDB; and if the updated reference counter value equals zero, delete the first existing virtual address entry;

if the updated reference counter value is greater than zero:

update the DDB reference counter of the first existing virtual address entry to equal the received reference counter value; and set the num decrements value of the first existing virtual address entry to equal 0.

29. A program storage device readable by a computer in a storage system, tangibly embodying a program of instructions executable by the computer to perform a method of deduplication management in the storage system, the storage system comprising a plurality of computers, each computer is assigned with access to a respective storage area in the storage-system and is responsive for handling write requests addressed to the respective storage area; the method comprising:

receiving a first write request including a first write data addressing a first logical block address;

computing a first hash value based on the first write data;

dividing the first hash value into a first hash value part (H1), and a second hash value part (H2);

assigning a first deduplication ID for the first write data, wherein deduplication IDs are assigned such that they are unique within the address space of the first logical block address;

providing a first virtual address reference key for the first write data, comprising; the first logical block address and the first deduplication ID;

querying a deduplication database (DDB) to determine whether H1 and H2 are already associated with an existing deduplication database entry (DDE) referencing an existing virtual address entry associated with a second logical block address assigned to a second computer from the plurality of computers, and if yes:

providing a first virtual address entry, comprising:

the first virtual address reference key and a first pointer pointing to the existing virtual address entry, the existing virtual address entry comprises a second pointer, pointing to a storage location, assigned to the second computer, where the write data is stored; and storing the first virtual address entry in a storage location assigned to the computer wherein if H1 or H2 are not already associated with an existing DDE:

creating a new DDE to be stored at the DDB for the first write data, the new DDE comprising:

H1 referencing respective data comprising:

H2, the first logical block address; the first deduplication ID; and a reference counter which is set to indicate that there is one virtual address entry associated with the new DDE; and creating a first virtual address entry comprising the first virtual address reference key and a first pointer pointing to a storage location, assigned to the computer, where the write data is stored; and storing the first virtual address entry in the storage area assigned to the computer.

30. A program storage device readable by a computer in a storage system, tangibly embodying a program of instructions executable by the computer to perform a method of deduplication management in the storage system, the storage system comprising a plurality of computers, each computer is assigned with access to a respective storage area in the storage-system and is responsive for handling write requests addressed to the respective storage area; the method comprising:

receiving a first write request including a first write data addressing a first logical block address;

computing a first hash value based on the first write data;

dividing the first hash value into a first hash value part (H1), and a second hash value part (H2);

assigning a first deduplication ID for the first write data, wherein deduplication IDs are assigned such that they are unique within the address space of the first logical block address;

providing a first virtual address reference key for the first write data, comprising; the first logical block address and the first deduplication ID;

querying a deduplication database (DDB) to determine whether H1 and H2 are already associated with an existing deduplication database entry (DDE) referencing an existing virtual address entry associated with a second logical block address assigned to a second computer from the plurality of computers, and if yes:

providing a first virtual address entry, comprising:

the first virtual address reference key and a first pointer pointing to the existing virtual address entry, the existing virtual address entry comprises a second pointer, pointing to a storage location, assigned to the second computer, where the write data is stored, wherein the first virtual address entry further comprises a validity indicator indicating that a read request addressing the first logical block address is to be directed to read data associated with the virtual address entry; and storing the first virtual address entry in a storage location assigned to the computer;

incrementing a reference counter of the existing DDE by 1;

wherein at the time of receiving the first write request, a first existing virtual address entry is already associated with the first logical block address assigned to the computer; the first existing virtual address entry comprises a pointer pointing to another existing virtual address entry associated with a logical block address assigned to a different computer; the method further comprising:

deleting the pointer pointing to the existing virtual address entry; and sending a decrement request to the DDB requesting to decrement the reference counter of a DDE referencing the other virtual address entry.

31. A program storage device readable by a computer in a storage system, tangibly embodying a program of instructions executable by the computer to perform a method of deduplication management in the storage system, the storage system comprising a plurality of computers, each computer is assigned with access to a respective storage area in the storage-system and is responsive for handling write requests addressed to the respective storage area; the method comprising:

receiving a first write request including a first write data addressing a first logical block address;

computing a first hash value based on the first write data;

dividing the first hash value into a first hash value part (H1), and a second hash value part (H2);

assigning a first deduplication ID for the first write data, wherein deduplication IDs are assigned such that they are unique within the address space of the first logical block address;

providing a first virtual address reference key for the first write data, comprising; the first logical block address and the first deduplication ID;

querying a deduplication database (DDB) to determine whether H1 and H2 are already associated with an existing deduplication database entry (DDE) referencing an existing virtual address entry associated with a second logical block address assigned to a second computer from the plurality of computers, and if yes:

providing a first virtual address entry, comprising:

the first virtual address reference key and a first pointer pointing to the existing virtual address entry, the existing virtual address entry comprises a second pointer, pointing to a storage location, assigned to the second computer, where the write data is stored, wherein the first virtual address entry further comprises a validity indicator indicating that a read request addressing the first logical block address is to be directed to read data associated with the virtual address entry; and storing the first virtual address entry in a storage location assigned to the computer;

incrementing a reference counter of the existing DDE by 1;

wherein at the time of receiving the first write request, a first existing virtual address entry is already associated with the first logical block address assigned to the computer and a second existing virtual address entry associated with another logical block address comprises a pointer pointing to the first existing virtual address entry and a validity indicator of the first existing virtual address entry indicates that a read request addressing the first logical block address should be directed to read data associated with the first existing virtual address entry; the method further comprising:

updating a validity indicator of the first existing virtual address entry to indicate that a read request addressing the first logical block address should not be directed to read data associated with the first existing virtual address entry; and sending a decrement request to the DDB requesting to decrement a reference counter of a DDE referencing the first existing virtual address entry.

32. A program storage device readable by a computer in a storage system, tangibly embodying a program of instructions executable by the computer to perform a method of deduplication management in the storage system, the storage system comprising a plurality of computers, each computer is assigned with access to a respective storage area in the storage-system and is responsive for handling write requests addressed to the respective storage area; the method comprising:

receiving a first write request including a first write data addressing a first logical block address;

computing a first hash value based on the first write data;

dividing the first hash value into a first hash value part (H1), and a second hash value part (H2);

assigning a first deduplication ID for the first write data, wherein deduplication IDs are assigned such that they are unique within the address space of the first logical block address;

providing a first virtual address reference key for the first write data, comprising; the first logical block address and the first deduplication ID;

querying a deduplication database (DDB) to determine whether H1 and H2 are already associated with an existing deduplication database entry (DDE) referencing an existing virtual address entry associated with a second logical block address assigned to a second computer from the plurality of computers, and if yes:

providing a first virtual address entry, comprising:

the first virtual address reference key and a first pointer pointing to the existing virtual address entry, the existing virtual address entry comprises a second pointer, pointing to a storage location, assigned to the second computer, where the write data is stored, wherein the first virtual address entry further comprises a validity indicator indicating that a read request addressing the first logical block address is to be directed to read data associated with the virtual address entry; and storing the first virtual address entry in a storage location assigned to the first computer;

incrementing a reference counter of the existing DDE by 1;

wherein at the time of receiving the first write request, a first existing virtual address entry is already associated with the first logical block address assigned to the first computer; the first existing virtual address entry comprises a pointer pointing to another virtual address entry associated with a logical block address assigned to a different computer; the method further comprising:

deleting the pointer pointing to the other virtual address entry; and notifying the different computer indicating that the pointer has been deleted;

wherein, at the different computer, the method further comprises:

incrementing a num_decrements counter of the other virtual address entry by 1;

if the num_decrements counter of the other virtual address entry is equal or greater than a deduplication database reference counter of the other virtual address entry and a validity indicator of the other virtual address entry is false, sending a decrement request to the DDB requesting to decrement the reference counter of the DDE referencing the other virtual address entry by a value which equals the num decrements counter;

receiving an updated reference counter value, after completion of the decrement request at the DDB;

if the updated reference counter value equals zero, deleting the other virtual address entry; and if the updated reference counter value is greater than zero, updating the deduplication database reference counter to equal the received reference counter value; and setting the respective num decrements value to equal 0.

33. A program storage device readable by a computer in a storage system, tangibly embodying a program of instructions executable by the computer to perform a method of deduplication management in the storage system, the storage system comprising a plurality of computers, each computer is assigned with access to a respective storage area in the storage-system and is responsive for handling write requests addressed to the respective storage area; the method comprising:

receiving a first write request including a first write data addressing a first logical block address;

computing a first hash value based on the first write data;

dividing the first hash value into a first hash value part (H1), and a second hash value part (H2);

assigning a first deduplication ID for the first write data, wherein deduplication IDs are assigned such that they are unique within the address space of the first logical block address;

providing a first virtual address reference key for the first write data, comprising; the first logical block address and the first deduplication ID;

querying a deduplication database (DDB) to determine whether H1 and H2 are already associated with an existing deduplication database entry (DDE) referencing an existing virtual address entry associated with a second logical block address assigned to a second computer from the plurality of computers, and if yes:

providing a first virtual address entry, comprising:

the first virtual address reference key and a first pointer pointing to the existing virtual address entry, the existing virtual address entry comprises a second pointer, pointing to a storage location, assigned to the second computer, where the write data is stored; and storing the first virtual address entry in a storage location assigned to the first computer;

incrementing a reference counter of the existing DDE by 1;

wherein at the time of receiving the first write request, a first existing virtual address entry is already associated with the first logical block address assigned to the first computer and a second existing virtual address entry stored at another computer comprises a pointer pointing to the first existing virtual address entry; the method further comprising:

updating a validity indicator of the first existing virtual address entry to indicate that a read request addressing the first logical block address should not be directed to read data associated with the first existing virtual address entry;

incrementing a num_decrements counter of the first existing virtual address entry by 1;

if a num_decrements counter of the first existing virtual address entry is equal or greater than a DDB reference counter of the first existing virtual address entry, sending a decrement request to the DDB requesting to decrement the reference counter at the DDE referencing the second existing virtual address entry by a value which equals the num_decrements counter;

receiving an updated reference counter value, after completion of the decrement request at the DDB; and if the updated reference counter value equals zero, deleting the first existing virtual address entry;

if the updated reference counter value is greater than zero:

updating the respective DDB reference counter to equal the received reference counter value; and setting the respective num decrements value to equal 0.

* * * * *